United States Patent
Zhang

(10) Patent No.: US 8,553,729 B2
(45) Date of Patent: Oct. 8, 2013

(54) HIERARCHICAL WIRELESS ACCESS SYSTEM AND ACCESS POINT MANAGEMENT UNIT IN THE SYSTEM

(75) Inventor: Shizhuang Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 324 days.

(21) Appl. No.: 13/002,047

(22) PCT Filed: Jul. 3, 2008

(86) PCT No.: PCT/CN2008/071540
§ 371 (c)(1),
(2), (4) Date: Dec. 30, 2010

(87) PCT Pub. No.: WO2010/000109
PCT Pub. Date: Jan. 7, 2010

(65) Prior Publication Data
US 2011/0141895 A1   Jun. 16, 2011

(51) Int. Cl.
*H04J 3/06* (2006.01)
*G06F 1/10* (2006.01)

(52) U.S. Cl.
USPC .......................................... 370/503; 375/356

(58) Field of Classification Search
USPC .......... 370/235, 328, 337, 338, 345, 347, 370/349, 351, 400, 401; 455/418, 41.2
See application file for complete search history.

(56) References Cited

U.S. PATENT DOCUMENTS

| | | | |
|---|---|---|---|
| 6,795,421 B1 | 9/2004 | Heinonen et al. | |
| 7,126,937 B2* | 10/2006 | Crosbie et al. | 370/350 |
| 7,301,926 B1* | 11/2007 | Dietrich et al. | 370/338 |
| 7,340,247 B1 | 3/2008 | O'Hara, Jr. et al. | |
| 8,165,062 B1* | 4/2012 | MacDonald | 370/328 |
| 2002/0024425 A1* | 2/2002 | Chiriatti | 340/310.01 |
| 2002/0114303 A1 | 8/2002 | Crosbie | |
| 2003/0091014 A1 | 5/2003 | Meier | |
| 2006/0209734 A1* | 9/2006 | Son et al. | 370/312 |
| 2007/0099667 A1* | 5/2007 | Graham et al. | 455/562.1 |
| 2010/0278122 A1* | 11/2010 | Singh et al. | 370/329 |

FOREIGN PATENT DOCUMENTS

| | | | |
|---|---|---|---|
| CN | 1631013 A | 6/2005 | |
| JP | 10190715 A | 7/1998 | |
| JP | 2007135150 A | 5/2007 | |
| WO | 02065707 A2 | 8/2002 | |

OTHER PUBLICATIONS

International Search Report in international application No. PCT/CN2008/071540, mailed on Apr. 2, 2009.
English Translation of the Written Opinion of the International Search Authority in international application No. PCT/CN2008/071540, mailed on Apr. 2, 2009.

* cited by examiner

*Primary Examiner* — Un C Cho
*Assistant Examiner* — Peian Lou
(74) *Attorney, Agent, or Firm* — Oppedahl Patent Law Firm LLC

(57) ABSTRACT

A hierarchical wireless access system includes terminals, access points, centralized access gateways and a plurality of master access point management units located at the access layer and adopting distributed architecture. The master access point management unit includes a communication interface interacting with the centralized access gateway and/or core networks, to which one or more access points are attached. The master access point management unit processes forwards the data and signaling among the attached access points, and provides the function of access gateway and local operation maintenance and network management. Construction of the master access point management unit and the access point in the system is also provided.

20 Claims, 14 Drawing Sheets

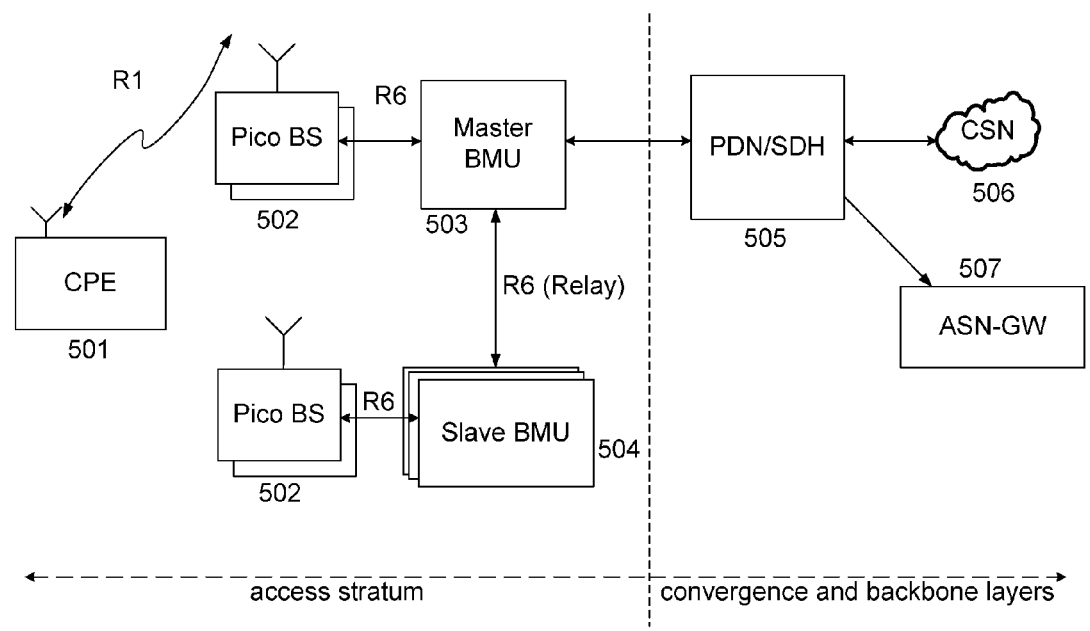

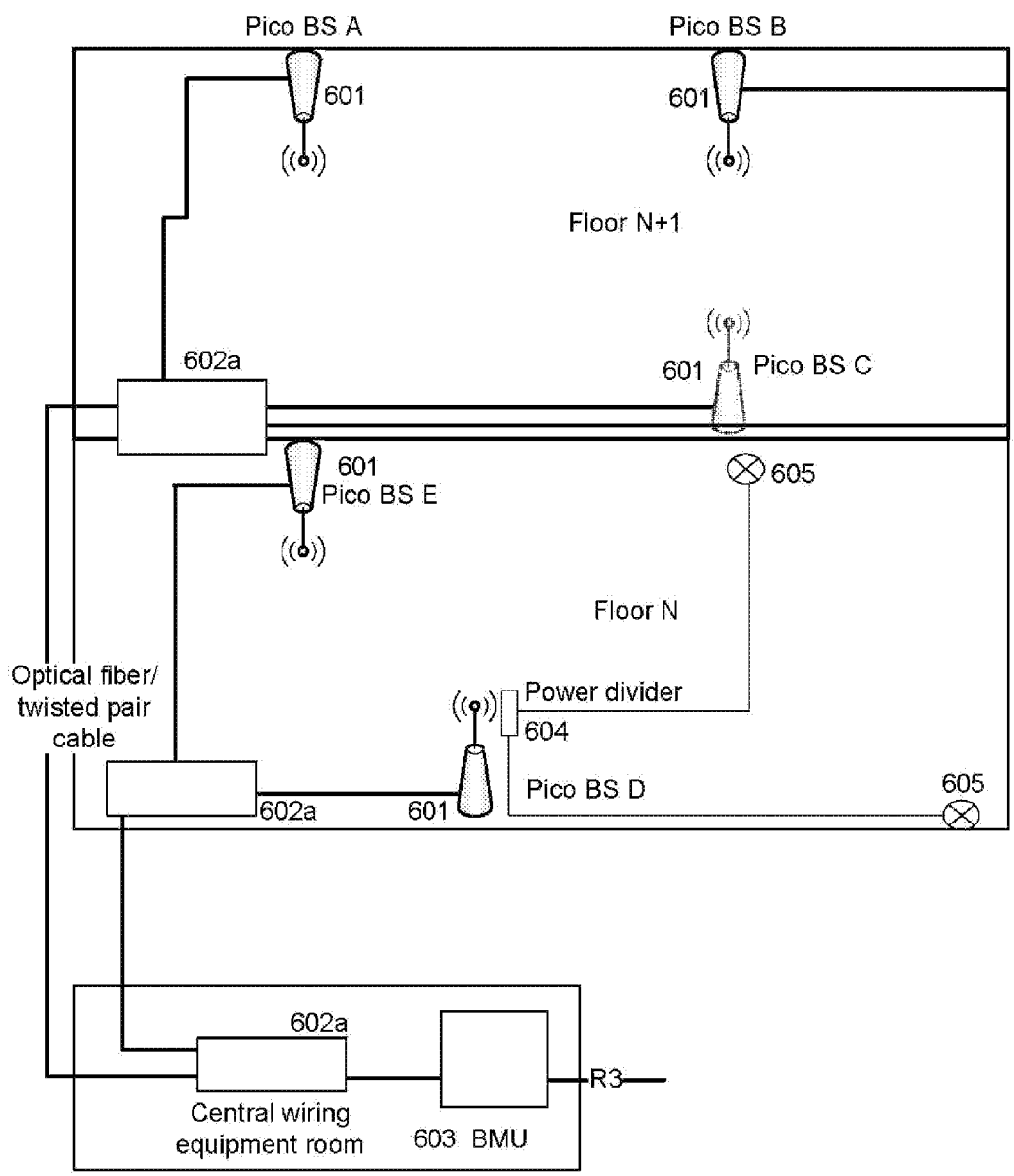

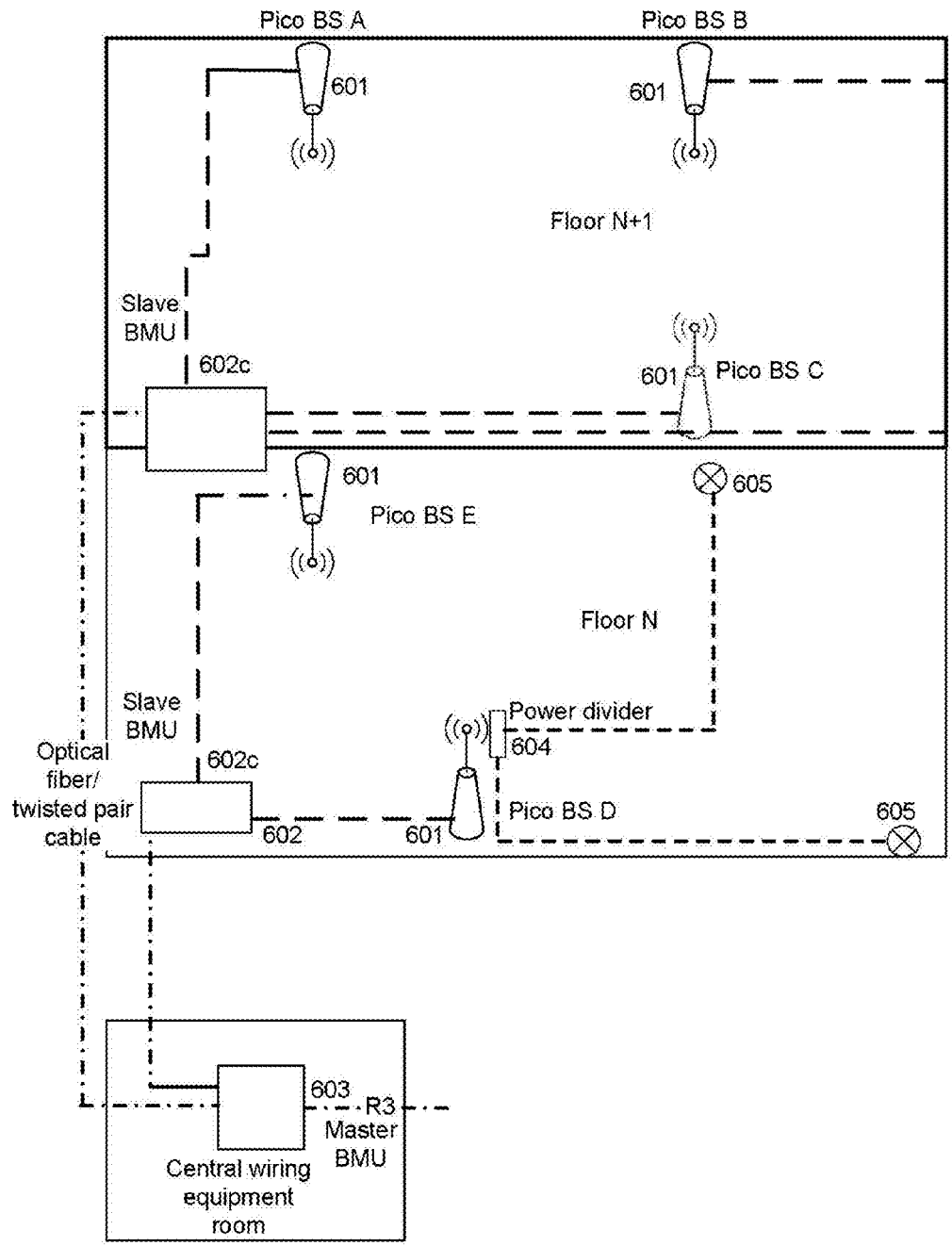

HIERARCHICAL WIRELESS ACCESS SYSTEM AND ACCESS POINT MANAGEMENT UNIT IN THE SYSTEM

TECHNICAL FIELD

The present invention relates to wireless access, and in particular, to a hierarchical wireless access system, an access point management unit in the system and related methods based on the system.

BACKGROUND

As shown in FIG. 1, an architecture of a current worldwide interoperability for microwave access (WiMAX) mobile network includes a customer premises equipment (CPE) 101 of WiMAX, base stations (BS) 102 of an access network of WiMAX, access service network gateways (ASN-GW, access gateway for short herein) 103, a connection service network (CSN) 104 of WiMAX, and a packet data network (PDN) or synchronous digital hierarchy (SDH) 105, wherein the CPE 101, the BSs 102 and the ASN-GWs 103 form an access service network (ASN) of WiMAX. With respect to interconnection, a standard R1 interface is used between the CPE 101 and the BS 102, a standard R6 interface is used between the BS 102 and the ASN-GW 103, a standard R8 interface is used between BSs 102, a standard R4 interface is used between ASN-GWs 103, an R3 interface is used between the ASN-GW 103 and the CSN 104, and the PDN/SDH 105 is a transmission bearing network of WiMAX.

At present, the main frequency band of the radio frequency of a WiMAX system is 2.3/2.5/3.5 GHz, if a conventional outdoor-covering-indoor mode of integrated macro base stations is adopted, a high transmission loss is caused in a dense urban area, and generally, a transmission loss of 18-25 dB is budgeted, thus, the simple adoption of the outdoor-covering-indoor mode will certainly bring about the reduction in the outdoor coverage radius, the increase in outdoor stations and network construction costs and the difficulty in fast networking. In addition, conventional outdoor macro base stations and micro base stations cannot meet the requirements of enterprises and commercial buildings with high telephone traffic, which have high requirements on capacity, need a high signal-to-noise ratio in a coverage area, and are required to meet the demands on high-order modulation of 16QAM or even 64QAM.

Furthermore, the adoption of the conventional outdoor macro base station and micro base station cannot meet the requirements of enterprises and commercial buildings with high telephone traffic, which have a high requirement on capacity, need a high signal-to-noise ratio in a coverage area, and are required to meet the demands on a high-order modulation of 16QAM or even 64QAM.

In conclusion, for the network construction for WiMAX and future 4G, a Pico Cell mode is recommended to complement indoor coverage in an urban area and a dense urban area. The existing Pico Cell scheme includes a baseband unit+Pico RRU mode and an integrated Pico BS mode; the present invention focuses on improved schemes and device management based on integrated Pico BSs.

At present, common methods adopted by a mobile system for deploying access points are as follows:

Scheme 1: in a coverage area, multiple independently-configured access points Pico BSs are adopted and connected with the access gateway of a central equipment room via a transmission network, and this scheme is a demonstration for an indoor coverage network based on the conventional Pico BS architecture.

The network structure of this scheme is as shown in FIG. 2, in this structure, each coverage area (as shown in FIG. 2, an area on a floor) is deployed with Pico BSs 201, and multiple independent Pico BSs 201 are connected with each other via a converging switch or router 202, and the switch or router 202 provides an R6 interface connected to a transmission network PDN/SDH 203. Each Pico BS 201 should be configured with a GPS module to solve the synchronization problem of a TDD (time division duplex) system and prevent interference from system networking. Although access points in an area are physically neighboring to each other, no logical channel communication is provided among the access points, that is, no local access management unit is provided in the whole building or among building groups, in this case, communication among Pico BSs 201, including switching control information among base stations and user interface information interaction of users among the access points in the area, has to be firstly routed to the ASN-GW 204 of a central equipment room node via the PDN/SDH 203, then accessed to the CSN 205, processed and sent to a target base station, this wastes much bandwidth of an SDH/PDH network. On the other hand, the performance deterioration, such as the delay and jitter generated in the process of passing a router of a public network, degrades the user experience. In commercial buildings and central business districts (CBD) with large-intermediate capacity, switching services of the majority of users occur among floors, on floors and in elevators, and at hallway and other overlapped coverage location, and the switching may happen frequently. It is very difficult to realize indoor deployment in the conventional Pico BS architecture because a Pico BS in this architecture is required to support interfaces including twisted pair cables, optical fibers and coaxial cables, and to be configured with a GPS antenna for the sake of synchronization, further, the conventional Pico BS architecture is not beneficial for network capacity optimization and cannot realize many scenes or has to pay much for the realization.

Scheme 2: in a coverage area, a Pico/Micro/Pico BS is adopted to provide a signal source, and RF signals are distributed to multiple antenna units via a passive distributed system, and the power of each antenna unit is equal to that of an access point. This scheme demonstrates an indoor coverage network based on a signal source base station+passive distributed antenna system architecture, which is applicable to a small-scale indoor coverage network.

The network architecture of this scheme is as shown in FIG. 3, in this architecture, a signal source base station (BS) 301 may be a Micro BS or a Pico BS, specifically depending on the scale of indoor coverage and the network topology condition. The signal source base station provides RF (radio frequency) signals to a power divider 302 and a coupler 303, and through multi-level distribution, the signals are output to a ceiling antenna 304 or a wall-mounted antenna 305, the specific type of antennae is determined according to indoor terrain and network planning. The difference between the power divider 302 and the coupler 303 lies in that the former realizes equal power division and the latter realizes proportional distribution of power transmitted to different ports as required. In this scheme, a Pico/Micro/Pico BS provides a signal source, RF signals are distributed to multiple antenna units via a passive distributed system, and each antenna unit has a power equal to that of an access point. One of disadvantages of this scheme is that the signal source base station is required to provide a high power, because the passive distributed system has high transmission loss and is not applicable to large-scale or intermediate-scale indoor coverage system networking, and another one is that a large engineering construction-and-deployment workload is needed for the expansion of cell capacity.

Scheme 3: in a coverage area, a Pico/Micro/Pico BS (401) is adopted to provide a signal source, and RF signals are distributed to multiple antenna units via an active distributed system, with the power of each antenna unit being equal to that of an access point. This scheme is an indoor coverage network based on a signal source base station+active distributed antenna system architecture, which is applicable to a large-scale or intermediate-scale indoor coverage network.

The network architecture of this scheme is as shown in FIG. 4, in this architecture, the connections and the functions of a signal source base station 401, a power divider 402, a coupler 403, a ceiling antenna 404 and a wall-mounted antenna 405 are identical to those in an indoor coverage network based on a passive antenna system architecture shown in FIG. 3. The biggest difference between the active distributed system and the passive distributed system shown in FIG. 4 lies in that a trunk amplifier 404 is deployed at a middle trunk location having high signal attenuation to resist the loss caused by line transmission. As 802.16e refers to a TDD system having strict requirements on time synchronization, the trunk amplifier 404 can extract transmit/receive time-sequence synchronization signals and compensate the symbol transmit/receive time sequence brought by the delays of different lines. In this scheme, a Pico/Micro/Pico BS is adopted to provide a signal source, RF signals are distributed to multiple antenna units via an active distributed system, the power of each antenna unit is equal to that of an access point, and a trunk amplifier 404 is added to a transmission line to compensate line losses. This scheme is applicable to a large-scale or intermediate-scale indoor coverage network but is not beneficial for post capacity expansion; in addition, the TDD system is required to solve the problems of coexistence with the existing system and the accompanying increase in the cost of intermediate nodes, as well as large costs and workloads of maintenance and capacity expansion, and also lower system reliability, etc.

Although the above is exampled by a WiMAX system, wireless access systems and methods in other existing indoor coverage scenes or mixed indoor and outdoor coverage scenes also have the following disadvantages:

1) the requirement on indoor cable resources is high, e.g., ample optical fibers, twisted pair cables or coaxial cables and other distributed systems are needed; partial operators (particularly, transnational operators in emerging markets) provide neither optical fiber resources nor twisted pair cable resources in the most majority of buildings, so it is very difficult to rate up network construction and reduce deployment cost;

2) in order to share existing distributed systems, considering the particularity of a TDD system, part of existing operators, who have realized 2G/3G indoor coverage, are required to make much modification to indoor antennas and filters, and the workload thereof is tremendous, moreover, the modification will interrupt existing network services, and cannot realize a smooth network upgrade;

3) as for the construction of a new piece of independent indoor distribution engineering, it is difficult to proceed the deployment, and it is necessary to modify the existing spatial structure, bringing about a difficulty in engineering coordination;

4) in a large-scale or intermediate-scale indoor coverage scene, the configuration of a Pico BS with GPS requires tremendous installation workloads and extreme high maintenance costs if multiple Pico BSs are required to be deployed;

5) an independent Pico BS has problems in management, local maintenance, and degradation in switching performance;

6) information interaction between independent Pico BSs lowers transmission efficiency;

7) an independent Pico BS brings about problems in performance statistics, performance bottlenecks and expansion of a centralized network management unit in version upgrade;

8) indoor distributed systems have problems in capacity expansion, scale and performance.

SUMMARY

The present invention aims to provide a hierarchical wireless access system, which is capable of locally realizing the management on access points in a building and the communication among the access points, accelerating a communication rate and a switching rate and saving system bandwidth.

In order to solve the technical problems above, the present invention provides a hierarchical wireless access system, which includes terminals, access points, centralized access gateways and a plurality of master access point management units located at an access layer and adopting a distributed architecture; wherein the master access point management unit has communication interfaces interacting with the centralized access gateways and/or core networks, to which one or more access points are attached; the master access point management unit processes and forwards data and signaling among the attached access points, and provides functions of access gateway, local operation and maintenance and network management for the attached access points.

Further, the wireless access system may be characterized in that: the access gateway function of the master access point management unit is realized by an AGW-Lite in the master access point management unit, the AGW-Lite converges access information of attached access points and processes tunnel protocols, provides routing switching information to a corresponding centralized access gateway, provides communication interfaces to interact with the centralized access gateways and/or core networks, and realizes one or more of the following functions: local wireless resource processing, self-routing for local flows, ending processing for tunnel processing of attached access points, flow shaping and flow control on attached access points and data stream scheduling processing based on access points.

Further, the wireless access system may be characterized in that:

the wireless access system further includes one or more slave access point management units, which may be connected with the master access point management units directly or after being cascaded, part of the access points attached to master access point management units connected with one slave access point management unit are attached to the slave access point management unit to process and forward data and signaling interaction among the attached access points;

and master access point management units and slave access point access point management units which are directly connected with the access points have a power-line modulation and demodulation function, and adopt the power line as a transmission medium to directly connect with the attached access points; and a communication cable is used as a transmission medium between the master access point management unit and the slave access point access point management unit.

Further, the wireless access system may be characterized in that:

the master access point management unit is connected with its attached access points directly or via a switch; and a communication cable is used as a transmission medium between the master access point management unit and the access points directly connected with the master access point management unit; or the master access point management unit has a power-line modulation and demodulation function, and the power line is used as a transmission medium between the master access point management unit and the access points directly connected with the master access point management unit.

Further, the wireless access system may be characterized in that:

the master access point management units, or the master access point management units and the slave master access point management units, are deployed in a building where the attached access points exist, or at a location where a cable resource of one of the attached access points can arrive.

Further, the wireless access system is characterized in that:

the master access point management units, or the master access point management units and the slave master access point management units, include timing servers for generating timing information and distributing the generated timing information to each attached access point; and the access point includes a timing client for receiving and restoring the timing information and taking the restored timing information as a local reference timing signal.

Further, the wireless access system may be characterized in that:

the timing server is a timing over packet server, namely, a ToP server, and the timing client is a timing over packet client, namely, a ToP client;

the ToP server is used for generating a hardware timestamp according to a reference timing signal output by a GPS receiving module or an external synchronous clock source and distributing the hardware timestamp in the form of a ToP information packet to each ToP client via network interfaces on the access point management unit side and the access point side; and after receiving the timing information packet, the ToP client restores the timing information and sends the restored information to a baseband and radio frequency module in the access points.

Further, the wireless access system may be characterized in that:

the wireless access system is applied to a scene of indoor coverage or a scene of mixed indoor coverage and outdoor coverage.

Further, the wireless access system may be characterized in that:

the wireless access system is an access service network of a WiMAX system, the access point is a Pico BS; the centralized access gateway is an access service network gateway ASN-GW; the master access point management unit interacts with the ASN-GW and/or network elements of a connection service network via the access gateway functional module.

Further, the wireless access system may be characterized in that:

a standard R6 interface is used between the master access point management unit and the Pico BS in the wireless access system, or between the master access point management unit and the slave access point management unit; a standard R3 interface is used between the master access point management unit and a network element of the connection service network; and a standard R4 interface is used between master access point management units and between the master access point management unit and the centralized access gateway.

Further, the wireless access system may be characterized in that:

the wireless access system further includes one or more couplers or power dividers taking the access points as signal sources and a passive distributed antenna system connected with the couplers or power dividers.

Further, the wireless access system may be characterized in that:

the wireless access system adopts a PUSC ALL Sub-Channel networking mode;

or the wireless access system adopts a PUSC Segment networking mode;

or the wireless access system adopts the PUSC Segment networking mode in a coverage-limited area and uses the PUSC ALL Sub-Channel networking mode in other areas.

Further, the wireless access system may be characterized in that:

the wireless access system combines multiple physically separated access points into a logical cell group, in which access points share different sub-channels of the same channel; different logical cell groups are distributed with different channels; and the master access point management unit distributes sub-channels according to location relations among the access points subordinate to the logical cell groups.

Further, the wireless access system may include one or more couplers, which couple three-phase currents of one transformer.

Another technical problem the present invention aims to solve is to provide an access point management unit in the hierarchical wireless access system to realize the management on the access points attached to the access point management unit and the communication among the access points.

In order to solve the technical problem, the present invention provides an access point management unit in the hierarchical wireless access system, wherein the hierarchical wireless access system includes the access point management unit located at an access layer and access points attached to the access point management unit; the access point management unit at least includes a master control switching module and a timing server, wherein:

the master control switching module, having a communication interface which interacts with access points attached to the access point management unit, is used to process and forward data and signaling interaction of the access points attached to the access point management unit; and the timing server is used for distributing clock information to timing clients of the access points attached to the access point management unit via the master control switching module.

Further, the access point management unit may be characterized in that:

the access point management unit is a slave access point management unit, and the master control switching module further has a communication interface connected to a master access point management unit or another slave access point management unit.

Further, the access point management unit may be characterized in that:

the access point management unit is a master access point management unit integrated with an access gateway functional module which is for converging access information of access points attached to the master access point management unit, processing tunnel protocols, providing routing switching information to a corresponding centralized access gateway, providing communication interfaces interacting with core networks, and realizing one of the following functions: local wireless resource processing, self-routing for local flows, ending processing for the tunnel processing of attached access points, flow shaping and flow control on attached access points and data stream scheduling processing based on access points.

Further, the access point management unit may be characterized in that:

the master access point management unit further includes a centralized network management functional module which is connected with the master control switching module to realize a centralized agent function on local network management and to process operation maintenance information, and the process includes one or more of the following: performance statistics, alarm management, version management, configuration management and fault diagnosis.

Further, the access point management unit may be characterized in that:

the timing server is a timing over packet server, namely, a ToP server, which is for generating a hardware timestamp according to a reference timing signal output by a GPS receiving module or an external synchronous clock source, and distributes the hardware timestamp to a ToP client of the attached access point via a ToP information packet.

Further, the access point management unit may be characterized in that:

the access point management unit includes a clock source, which is connected with the timing server to output a reference timing signal to the timing server.

Further, the access point management unit may include a power line modulation demodulation functional module, which is connected with the master control switching module and connected to an access point via a power line to modulate and demodulate signals transmitted by the power line and to perform a link detection and/or adaptive processing.

Another technical problem the present invention aims to solve is to provide an access point in the hierarchical wireless access system to realize synchronization among access point management units.

In order to solve the technical problem the present invention provides an access point in the hierarchical wireless access system adopting power line transmission, wherein the access point includes a timing client, which includes a configuration information storage unit, a timing signal restoration unit, a timing state determination unit and a scheduling control unit, wherein:

the configuration information storage unit is used for storing multiple configured timing states and corresponding scheduling mode information, and determination condition information of each timing state related to a timing precision;

the timing signal restoration unit is used for restoring a timing signal according to a received timing information packet, outputting the restored timing signal to a baseband and radio frequency module, and at the same time, outputting a convergence condition of a timing algorithm to the timing state determination unit;

the timing state determination unit is used for determining the current timing precision according to the convergence condition of the timing algorithm, determining the current timing state according to the configured timing state determination condition and outputting the determined timing state to the scheduling control unit; and the scheduling control unit is used for determining a corresponding scheduling mode according to the current timing state and carrying out uplink scheduling and downlink scheduling.

Further, the access point may be characterized in that:

the timing state stored in the configuration information storage unit includes a locked state, a free oscillation state and an intermediate state, wherein the timing precision corresponding to the intermediate state is between that corresponding to the locked state and that corresponding to the free oscillation state; and the scheduling mode corresponding to the locked state stored in the configuration information storage unit refers to normal uplink scheduling and normal downlink scheduling; the scheduling mode corresponding to the intermediate state includes: marking the last or multiple symbols of an uplink as a unavailable state; and the scheduling mode corresponding to the free oscillation state includes: turning off a transceiver.

Another technical problem the present invention aims to solve is to provide a synchronization method in a hierarchical wireless access system to realize clock synchronization between access point management units and access points to guarantee normal operation of the system.

In order to solve the problem above, the present invention provides a synchronization method in a hierarchical wireless access system including access point management units located at an access layer and access points attached to the access point management units, wherein the access point management unit includes a timing server, the access point has a timing client, the timing server generates timing information and distributes the timing information to the timing client of each attached access point, and the timing client restores the timing information and takes it as a local reference timing signal.

Further, the synchronization method may be characterized in that: the timing server is a timing over packet server, namely, a ToP server, and the timing client is a timing over packet client, namely, a ToP client; the ToP server is used for generating a hardware timestamp according to a reference timing signal output by a GPS receiving module or an external synchronous clock source and sending a ToP information packet to each ToP client via network interfaces on the sides of the access point management units and the access points according to the address information of each access point; and after receiving the ToP information packet, the ToP client restores the timing information and sends the restored information to a baseband and radio frequency module in the access points, wherein the restored information is used as a reference timing signal of the baseband and radio frequency module.

Further, the synchronization method may be characterized in that: the access point management unit is a master access point management unit having a function of access gateway, a communication cable or a power line is used as a transmission medium between the master access point management unit and an access point attached to the master access point management unit; or the access point management unit includes a master access point management unit having a function of access gateway and one or more slave access point management units connected with the master access point management unit, the master access point management unit and the slave access point management units, which are directly connected with attached access points, have a power-line modulation and demodulation function and use a power line as a transmission medium, via which they are directly connected to the attached access points.

Further, the synchronization method may be characterized in that:

an QoS type of the timing information is configured in the timing server or timing client to be a priority identical with or higher than a real-time service, the scheduling policy corresponding to the QoS type is respectively carried out on the access point management unit side and the access point side, and the timing information is distributed and routed synchronously with real-time services or prior to the real-time services.

Further, the synchronization method may be characterized in that:

an end-to-end flow control mechanism, which is realized between the access point management unit and the access point, is activated when the access point is not synchronous with the access point management unit, and data are sent in a normal process after the access point is synchronous with the access point management unit.

Further, the synchronization method may be characterized in that the hierarchical wireless access system adopts one or more of the following methods for improving synchronization performance:

when powered and initialized, the timing server in the access point management unit sends, in the form of a smallest packet, timing information data to attached access points through broadcast in a sub-network;

in an initial access state, an access point that is newly added into the network only makes basic timing information packets and state configuration information transmitted between the access point management unit and itself; the access point management unit controls, according to the feedback on synchronization state information of access points, the access points to be powered and activated or not;

the jitter and the flutter in an Ethernet are removed by using algorithms of a loosely coupled phase-locked loop, a narrow-band loop and an adaptive filter; the synchronization quality of the network is automatically detected by using an adaptive HOLDOVER algorithm, and control parameters are automatically memorized when the synchronization performance is optimal; the HOLDOVER state is automatically switched to when the quality of the network is deteriorated and the memorized control parameters are used to refresh the current control parameters;

when the bandwidth occupation rate of data transmission of all the nodes is smaller than a given threshold, the access point management unit regulates the sending frequency of ToP messages to optimize the synchronization performance;

a continuous rate measurement is realized in the access point management unit, a data packet is normally routed to each access point in the absence of congestion; once the congestion happens, a policy-based packet dropping mechanism is carried out to guarantee the performances of services with high priority.

Another technical problem the present invention aims to solve is to provide a flow control method used in a hierarchical wireless access system to perform a flow control and guarantee the normal running of the system.

In order to solve the technical problem above, the present invention provides a flow control method used in a hierarchical wireless access system including access point management units located at an access layer and access points attached to the access point management units, wherein the flow control method includes:

classifying and marking media packets when they arrive at the access point management unit, and, according to target addresses, making the packets enter a queue of each access point and sending the packets to a corresponding access point, and establishing an end-to-end flow control between the access point management unit and each access point.

Further, the flow control method may be characterized in that:

the access point management unit sets a guaranteed bandwidth and the maximum available bandwidth for the downlink of each attached access point;

when performing a flow control on the downlink, the access point management unit identifies and calculates the flow of each attached access point, and normally stores and forwards, if the statistical flow of an access point is in a given bandwidth-guaranteed range, the data of the access point; and if the statistical flow of the access point is greater than the guaranteed bandwidth but smaller than the maximum available bandwidth, the access point management unit uses a weighted average algorithm to distribute the surplus bandwidth to an overloaded attached access point queue, and discards first, if the statistical flow of the attached access points is still overloaded, the packets in a BE (best effort) service queue of the access points.

Further, the flow control method may be characterized in that:

the access point management unit sets a guaranteed bandwidth and the maximum available bandwidth for the uplink of each attached access point;

the access point performs a flow control on the uplink and guarantees the distributed uplink flow not to exceed the maximum available bandwidth when distributing a bandwidth for each terminal user according to the uplink bandwidth; and the access point management unit sends a flow control message to an access point having an uplink flow exceeding the guaranteed uplink bandwidth when it detects that the total uplink bandwidth exceeds the load threshold of the processing capacity thereof, and the access point reduces the uplink bandwidth to the range of the guaranteed bandwidth after receiving the flow control message.

Another technical problem the present invention aims to solve is to provide a scheduling method based on a synchronization state in a hierarchical wireless access system to lower the requirements on synchronization precision and improve the robustness of the system.

In order to solve the technical problem above, the present invention provides a scheduling method based on a synchronization state in a hierarchical wireless access system that includes access point management units located at an access layer and access points attached to the access point management units, wherein the scheduling method includes:

multiple synchronous states and corresponding scheduling modes are configured at the access points, and a determination condition related to timing precision is configured for each synchronous state; and after receiving a timing information packet from the access point management unit, the access point restores the timing information in the packet and detects the current timing precision, determines the current synchronous state according to the determination condition, and carries out uplink scheduling and downlink scheduling according to the scheduling mode corresponding to the current synchronous state.

Further, the scheduling method may be characterized in that:

the synchronous state includes a locked state, a free oscillation state and an intermediate state, the timing precision corresponding to the intermediate state is between that corresponding to the locked state and that corresponding to the free oscillation state;

the access point carries out normal uplink scheduling and normal downlink scheduling when it determines the current synchronous state is a locked state the timing precision of which meets requirements;

when determining that the current synchronous state is the free oscillation state in which normal working cannot carried out and a neighbor cell exists, the access point turns off a transceiver but maintains the normal working of the link between the access point and the access point management unit to which the access point is attached; and the access point marks the last n symbols on the uplink as unavailable when it determines the current synchronous state is an intermediate state and a neighbor cell exists, wherein n=1, 2, 3 . . .

Further, the scheduling method may be characterized in that:

the intermediate state is classified into a first state and a second state, the second state occurs after the first state lasts for a given period;

when determining that the current synchronous state is the first state and a neighbor cell exists, the access point marks the last one or more symbols on the uplink as unavailable and carries out normal scheduling on the downlink; and when determining that the current synchronous state is the second state and a neighbor cell exists, the access point marks the last N symbols on the uplink as unavailable and sets the maximum transmitting power to a power-derated state on the downlink.

Further, the scheduling method may be characterized in that:

the access point is determined to be in a free oscillation state when it determines that the timing precision is greater than or equal to a timing precision threshold or the second state has been maintained for another given period.

Further, the scheduling method may be characterized in that:

the hierarchical wireless access system is a WiMAX time division duplex system, the access point is a Pico BS, and n=1.

Further, the scheduling method may be characterized in that:

when the access point is started, a power-on self-test and a normal starting process are carried out on the minimum system which does not include an transmitter part, then the current synchronous state is detected according to the convergence condition of the timing algorithm of a timing client and then marked; and the access point carries out a regular synchronous state detection and update, and at the same time, carries out scheduling policy update and implementation according to the current synchronous state detected.

Further, the scheduling method may be characterized in that:

the access point management unit is a master access point management unit having a function of access gateway, a communication cable or a power line is used as a transmission medium between the master access point management unit and access points attached to the master access point management unit; or the access point management unit includes a master access point management unit having a function of access gateway and one or more slave access point management units connected with the master access point management unit, the master access point management unit and the slave access point management units, which are directly connected with the attached access points, have a power-line modulation and demodulation function and use the power line as a transmission medium via which they are directly connected to the attached access points.

Further, the scheduling method may be characterized in that:

the access point reports the synchronous state to the master access point management unit to which the access point is subordinate, and the master access point management unit notifies the attached access point of the neighbor cell information of each access point, including the existence of a neighbor cell and the synchronous state information of a neighbor cell.

Another technical problem the present invention aims to solve is to provide a distributed network management system in a hierarchical wireless access system to make most flow controlled in a local network to save network management cost and transmission bandwidth.

In order to solve the technical problem above, the present invention provides a distributed network management system in a hierarchical wireless access system, the distributed network management system includes a network element management system and a network management center, wherein network elements at an access layer managed by the network management system are based on a hierarchical architecture and include a master access point management unit located at the access layer and access points attached to the master access point management units, and the network management system includes a first network management agent module residing on the master access point management unit and a second network management agent module residing on the access point, wherein the first network management agent module is used for interacting with the network element management system and the attached access points to realize network management on the master network element management unit and the access points attached to the master network element management unit; and the second network management agent module is used for interacting with the access point management unit to realize network management on the access point.

Another technical problem the present invention aims to solve is to provide a distributed network management method in a hierarchical wireless access system to reduce the load of a network element management system and a backbone network and improve the performance and the reliability of network management.

In order to solve the technical problem above, the present invention provides a distributed network management method based on the network management system, in which part of network management functions are realized on a master access point management unit side and an access point side, the master access point management unit exchanges network management information with a network element management system to realize network management on the master access point management unit, meanwhile, the master access point management unit exchanges network management information with the attached access points to realize network management on the attached access points.

Further, the network management method may be characterized in that:

the network management includes software version management and maintenance, which includes one or more of the following processing:

system configuration parameters of the master access point management unit and each access point are stored in the form of a file in the master access point management unit and each access point, the file can be imported and exported, and a copy of the file is stored in the network element management system;

operation and maintenance personnel configure and update the master access point management unit and the access points on site to form a new profile and upload the new profile to the network element management system;

operation and maintenance personnel remotely upgrade the versions of the master access point management unit and/or the access point system; the network element management system uniformly distributes new version content to the target master access point management unit and controls version distribution and activates process; and the new version content related to the access points is distributed to the attached access points via the master access point management unit;

operation and maintenance personnel check the system configuration of the master access management unit by remotely accessing a client of the network element management system via a virtual private network or have a check directly at the client of the network element management system, and then update the system configuration; and two system versions are stored in the master access point management unit, and the system version is automatically returned to the former available version when a remote update is failed.

Further, the network management method may be characterized in that:

the network management includes performance statistics, wherein the performance statistics includes one or more of the following processing:

the master access management unit collects the running condition of the wireless service resources of the attached access point system in real time to dynamically observe and track the usage of system resources and user services;

the master access management unit checks the application of radio frequency resources at one access point, and checks and updates the transmitting power of the radio frequency; and the master access management unit performs a data analysis automatically according to the running condition of wireless resources illustrated in performance statistics data and sends a system capacity alarm notification to the network element management system if one access point is subjected to a wireless resource utilization overload and congestion in a continuous period.

Further, the network management method may be characterized in that:

the network management includes alarm information processing, wherein the alarm information processing includes one or more of the following processing:

the master access management unit collects the system running state information of the attached access points in real time, and records, once an anomaly is detected, abnormal information into a file and uploads the abnormal data to the network element management system; and the network element management system diagnoses system errors according to related alarms and the reported abnormal information;

a filter with an alarm screening function is arranged between the master access management unit and the network element management system to screen non-emergency alarm information which will be stored in the master access management unit and notify the network element management system of emergency alarms; and the network element management system polls the master access management unit in a specified area, and the master access management unit reports fault information in a given time.

Another technical problem the present invention aims to solve is to provide a frequency distribution method in a hierarchical wireless access system to realize automatic frequency configuration and management with the aid of a master access management unit.

In order to solve the technical problem above, the present invention provides a frequency distribution method in a hierarchical wireless access system; the hierarchical wireless access system includes access point management units located at an access layer and access points attached to the access point management units; the frequency distribution method includes:

after being started and working normally, an access point applies to an access point management unit to which the access point is subordinate for frequency resources;

the access point management unit determines a candidate frequency of each access point according to the neighbor relations among the access points and sends the candidate frequency to a corresponding access point; and after an access point receives its candidate frequency, it detects the signal quality of the candidate frequency, notifies the access point management unit to re-select a frequency if the detection is not passed and the former step is re-executed; if the detection is passed, a normal working process proceeds until ends.

Further, the frequency distribution method may be characterized in that:

after being started, the access point first carries out a power-on self-test and normal starting on the minimum system and then initiates a handshake authentication to apply to the access point management unit for a legal frequency resource; after receiving a candidate frequency distributed by the access point management unit the access point is subordinate to, the access point turns on a transceiver to carry out a received-signal-strength indication, namely, an RSSI (received signal strength indication) signal detection; if the interference signal of the candidate frequency is smaller than or equal to a given threshold, then the detection is determined to be passed, otherwise, the detection is determined not to be passed.

Further, the frequency distribution method may be characterized in that:

when the access point management unit adopts a PUGS Segment mode for network construction, a candidate frequency and segment is selected for the access point in the following way: first, a neighbor cell list of each access point is acquired, an access point with the simplest neighbor relation is selected and a random frequency and segment is selected for the access point, then, a frequency and segment is selected for the access points in the neighbor cell list of the access point, different frequencies and segments are distributed to the neighboring access points which interfere with each other, and in this manner, a frequency and segment is orderly selected for each access point.

Further, the frequency distribution method may be characterized in that:

when a new access point is added, the access point management unit acquires the frequency information of the neighbor cell of the new access point and selectable frequency resources and selects a frequency different from that of the neighbor cell of the new access point for the new access point.

Further, the frequency distribution method may be characterized in that:

when the access point management unit adopts a PUCS All sub-channel mode for network construction, a candidate frequency is selected for the access point in the following way: first, the neighbor cell list of each access point is acquired, the access point with the simplest neighbor relation is selected and a random frequency is selected for the access point, then, a frequency is selected for the access points in the neighbor cell list of the access point, different frequencies are distributed for the neighboring access points which interfere with each other, and in this manner, a frequency is orderly selected for each access point.

Further, the frequency distribution method may be characterized in that:

the access point management unit stores frequency information of the attached access points and sends the stored historical frequency information of the access points back to the access points when the attached access points are re-started due to an anomaly.

In summary, the technical solution disclosed in the present invention has the following technical advantages:

a hierarchical network management architecture is supported and a mechanism of integrating AGW-Lite with a BMU is provided, therefore, the expansion capability and the network performance of the system are greatly improved, which are beneficial for large-capacity network construction; the most flow in hierarchical transmission of network management information and local routing of internal information of access points attached to the BMU is controlled in a local network, thus saving the network management cost and transmission bandwidth, improving the satisfaction of users in an coverage area on the access to internal resources, e.g. access delay, switching delay and jitter, and additionally, lowering requirements on transmission;

flexible interfaces and mediums can be adopted between access points and the BMU, a BMU+Pico BS architecture, which supports flexible adoption of multiple mediums such as twisted pair cables, optical fibers and power lines, is applicable to different scenes and facilitates engineering deployment and fast network construction, and preferably, power lines are taken as the transmission medium. When access points based on power lines are adopted, a passive distributed antenna system can be locally deployed, without adding a trunk amplifier or modifying a filter.

A ToP clock distribution mechanism based on a hierarchical BMU architecture can be adopted, access points can share a BMU-configured GPS clock; the transmission of timing information over twisted pair cables, cables, optical fibers and even power lines is supported; and after the access points complete the restoration of the timing information, there is no need to configure a GPS module or an antenna for each access point, thus, the engineering difficulty and the engineering cost are lowered, and the CAPEX and the OPEX of operators are reduced;

due to the uncertainty brought about by interference signals of a power line system, the present invention can realize an intelligent adaptive scheduling mechanism of the system according to an link state and the restoration quality of the timing signals, guaranteeing the robust running of the system, and greatly improving the adaptive capacity of the system to environment as well as the availability of the system.

A centralized agent function of local network management can be realized on a hierarchical master BMU, thus facilitating system maintenance; and the maintainability, the reliability and the expansibility of the system can be improved by the distributed network management.

A dual-homed mechanism based on an AGW-Lite and a centralized ASN-GW can be provided to guarantee the reliability of the system; a Pico BS in an indoor coverage area is homed to the AGW-Lite gateway under a normal condition and is automatically switched to the centralized ASN-GW when an anomaly happens;

the BMU supports load monitoring and management on Pico BSs subordinate to the BMU; a PUSC Segment network construction mode which is configured at the initial state of network construction can be smoothly upgraded to PUSC ALL Sub-Channel, and the capacity expansion of the system is supported.

BRIEF DESCRIPTION OF THE DRAWINGS

FIG. 5 is a schematic diagram illustrating the structure of a WiMAX network based on a hierarchical BMU architecture in an embodiment of the present invention;

FIG. 6A is a schematic diagram of a WiMAX access point management system based on twisted pair cables/optical fibers in an embodiment;

FIG. 6C is a schematic diagram of a WiMAX access point management system based on power line transmission in another embodiment;

DETAILED DESCRIPTION

Figure 1:
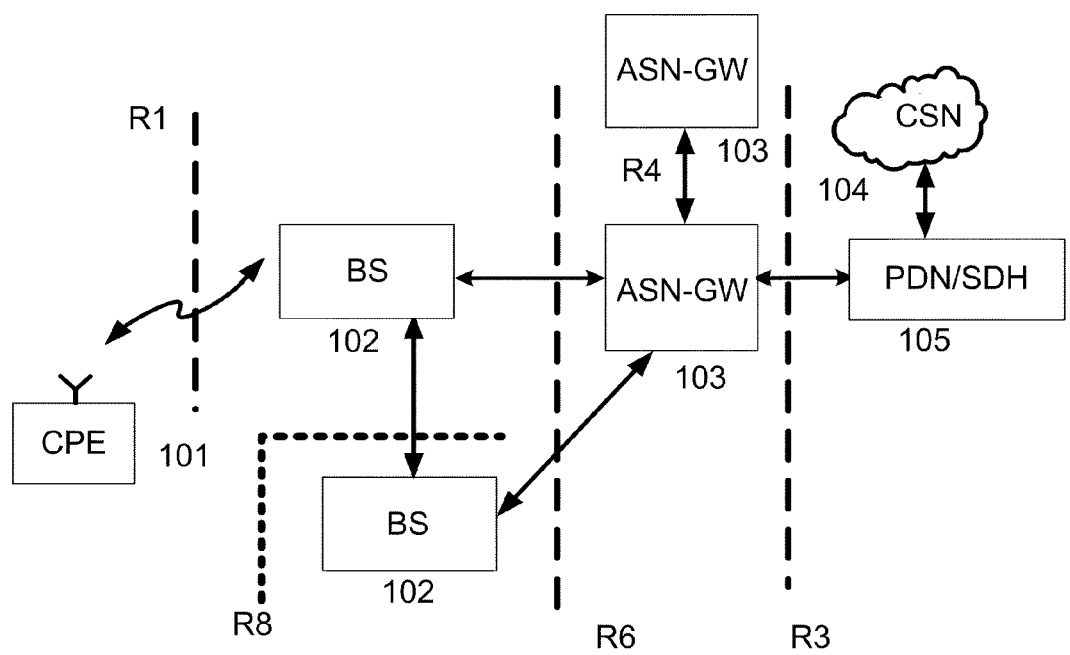
FIG. 1 is a schematic diagram of the architecture of a WiMAX mobile network.
Figure 2:
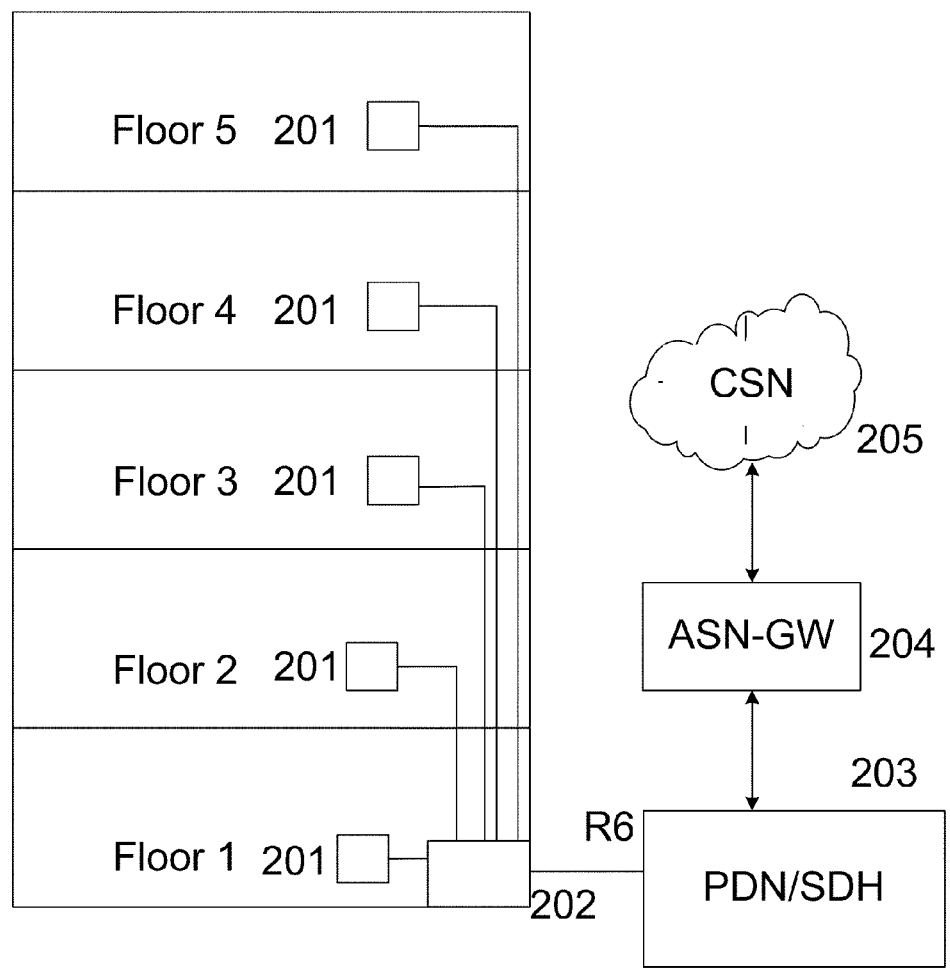
FIG. 2 is a schematic diagram of an indoor coverage network based on a conventional Pico BS architecture.
Figure 3:
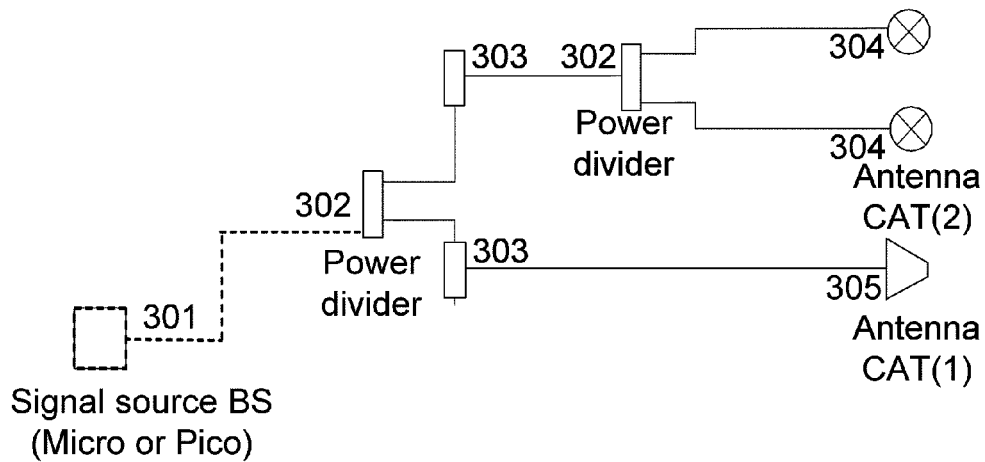
FIG. 3 is a schematic diagram of an indoor coverage network based on a signal source base station+passive distributed antenna system architecture.
Figure 4:
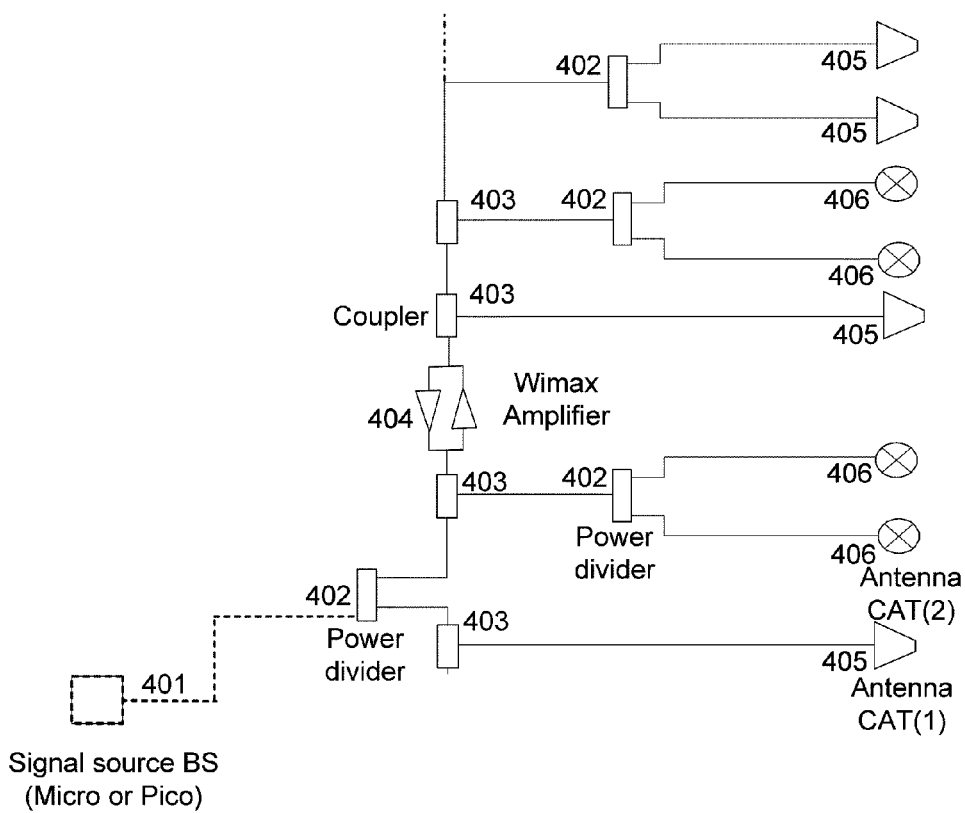
FIG. 4 is a schematic diagram of an indoor coverage network based on a signal source base station+active distributed antenna system architecture.

The present invention is described in detail below in combination with attached drawings and preferred embodiments. It should be noted that although a WiMAX system is taken as a example hereinafter, the present invention is also applicable to other TDD and FDD systems based on an orthogonal frequency division multiple access (OFDMA) system, such as a long term evolution (LTE) system, a time division-synchronization code division multiple access (TD-SCDMA) system and an ultra mobile broadband (UMB) system and the like, as well as all wireless indoor coverage technologies. This invention is applicable to these scenes including coverage-limited scenes and capacity-limited scenes, flexibly realizes a smooth upgrade from initial coverage limitation to post capacity limitation, protects existing device investments, and reduces maintenance costs by realizing the maintenance and upgrade only at BMU centralized points.

Before going into the discussion on this embodiment, the following concepts should be explained:

an access point, considering that an coverage area is mainly an indoor area, is a WiMAX base station mainly in the form of Pico BS in this embodiment, however it may be a base station in other systems or an access point in other forms;

an access point management unit, also called as a building management unit (BMU) in this invention, does not belong to an existing building management system, but is dedicatedly used as a functional entity performing centralized management on an indoor Pico BS, and integrates the function of a Light ASN-GW (AGW-Lite);

hierarchy division means that the whole WiMAX network is divided to a CSN and an ASN, and the ASN is further divided into several hierarchies including a centralized ASN-GW, a distributed AGW-Lite, a base station and a customer premises equipment; and power line transmission refers to a power line network for providing an alternating current low-voltage power supply for room illumination, electric appliances and aisles in the building.

The architecture of a WiMAX network in the embodiment is described first.

FIG. 5 is a WiMAX network based on a hierarchical BMU architecture disclosed in the present invention, which is mainly applicable to indoor coverage scenes and also is applicable to mixed indoor and outdoor coverage scenes in a local area, and the following illustration is given by taking a Pico BS as an example, the Pico BS is the main type of base stations in indoor coverage.

As shown in FIG. 5, the ASN adopts a hierarchical architecture and includes four architectures consisting of a CPE 501, Pico BSs 502, BMUs and a centralized ASN-GW 507, wherein the BMUs are further divided into a master BMU 503 and a slave BMU 504, supporting network expansion by connecting the slave BMU 504 to the master BMU 503 directly or via a cascade interface. A standard R6 interface is respectively used between the Pico BS 502 and the master BMU 503, and between the Pico BS 502 and the slave BMU 504, a standard R3 interface is used between the master BMU 503 and the CSN 506 (the R3 is a logical interface, and is used to connect the master BMU with the CSN via an SDH or PDN), a standard R4 interface (omitted in the figure) is respectively used between the master BMUs 203 as well as between the master BMU and the centralized ASN-GW 507. A standard R6 interface is respectively used between the slave BMUs 504 and between the slave BMU 504 and the master BMU 503. The slave BMU is optional. And the PDN/SDH 505, the CSN (connection service network) 506 and the centralized ASN-GW 507 are all network elements at convergence and backbone layers.

Various networking forms can be flexibly supported between the master BMU and the slave BMU, including a star network, a chain network and a tree network. A communication cable such as an optical fiber, a twisted pair cable, a coaxial cable and the like may be used as a transmission medium between the master BMU and the slave BMU; an optical fiber, a twisted pair cable, a coaxial cable, a power line and the like may be used as a transmission medium between the master BMU and a Pico BS, and between the slave BMU and a Pico BS.

Since an ASN-GW is a centralized point and a control node for a protocol ending on a wireless access side and implements functions of wireless resources management, switching management, paging management and routing protocol processing of an IP network, the conventional scheme generally employs a centralized deployment manner, in which ASN-GWs are located at convergence and backbone layers. A hierarchical deployment scheme is proposed in this invention for the architecture of network deployment, wherein in important indoor coverage areas, a BMU adopting a hierarchical architecture is deployed close to a base station and installed at an access player, and the BMU is integrated with an intermediate-capacity or small-capacity ASN-GW functional modules (called AGW-Lite hereinafter, in order to be distinguished from a centrally deployed ASN-GW). The BMU processes and routes data of an access point and also carries out network management on the access point. Taking the requirement on seamless coverage into consideration, this invention deploys a centralized ASN-GW at a convergence layer or a backbone layer.

An indoor area is a main area where traffic flows happen in both existing 2G/3G network and the future 4G network, it is indicated by the statistic data of NTT DoCoMo in an existing network that indoor use accounts for 70% in user distribution, and the behaviors of this part of indoor users are generally static or low-rate; if AGS-Lites are deployed in a distributed manner, data and control-plane signaling interaction among base stations managed by the same master BMU (including the cascaded slave BMU) are directly processed and forwarded by the BMU, without being routed to a central CSN node. That is, WiMAX protocols are ended in each access point building, and the data and the control-plane signaling interaction are directly accessed into an IP data network, thus, the capacity demanded for centralized ASN-GW deployment is greatly reduced.

In general, enterprise networks, important coverage buildings or groups are main areas where traffic flows happen; for the enterprise networks, a large proportion of flow happens within Intranet; according to the data flow statistics of the Intranet of ZTE, almost 50% of the flows happen in the Intranet; by adopting a hierarchical BMU architecture and deploying an AGW-Lite in network communication, WiMAX protocols are ended in each access point building, and this part of flows are digested inside the AGW-Lite, the pressure of the transmission network is thus reduced. The transmission bandwidth occupation and the running cost will be increased by 50% if the conventional centralized ASN-GW deployment scheme is adopted.

The present invention supports the dual homing of a Pico BS to an AGW-Lite and a centralized ASN-GW to improve the reliability of the system; in a default state, the Pico BS is homed to an AGW-Lite built in the BMU; and when the AGW-Lite goes wrong, the flow of the Pico BS automatically identifies the fault through an online R6 link detection, then the Pico BS is switched to the centralized ASN-GW.

FIG. 6A illustrates a solution to the deployment of a BMU connected to access points via twisted pair cables/optical fibers in an embodiment. A WiMAX FDD system and other non-WiMAX wireless access systems can also be realized based on the architecture of FIG. 6.

The wireless access system mainly includes Pico BSs 601 and a centralized master BMU 603; the Pico BSs 601 are connected with the master BMU 603 via standard R6 interfaces through an LAN in the building (including switches 602a); physical interfaces in this system can be electrical interfaces or optical interfaces, and a physical rate can be 100 Mbps or 1000 Mbps. The bearing medium can be an optical fiber or a twisted pair cable. In this technical scheme, it is only necessary to configure one BMU 603, namely a master BMU. Network expansion can be realized by a general switch, without configuring a slave BMU. Generally, the BMU 603 is locally deployed in a building where a WiMAX base station exists, but this is only an example, the BMU can also be deployed in a place where cable resources of attached access points can arrive. Additionally, it is allowed to configure one BMU for multiple small neighboring buildings.

Figure 6B:
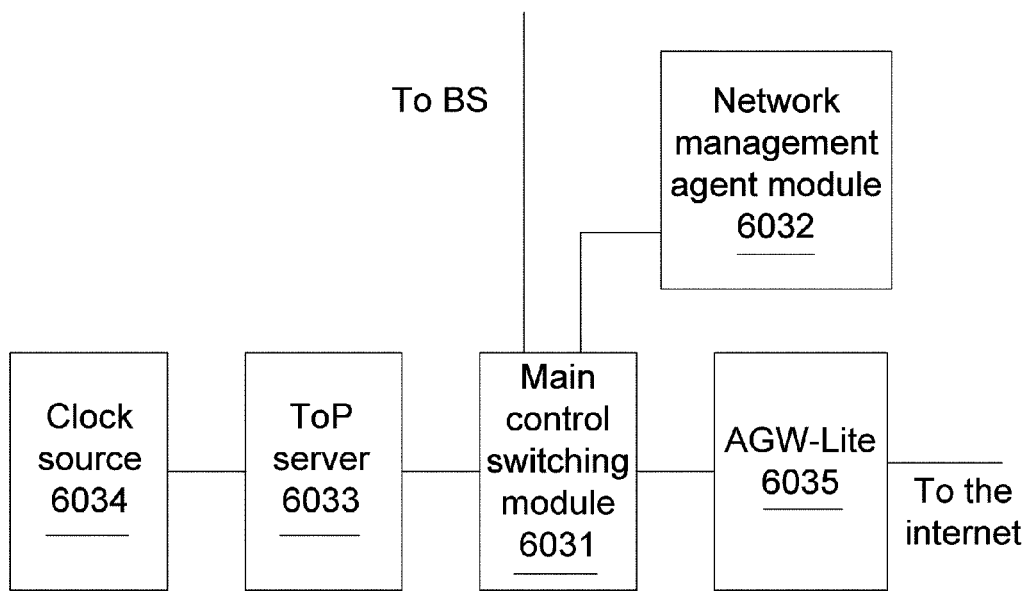
FIG. 6B is a diagram of the functional modules of the BMU in FIG. 6A.

As shown in FIG. 6B, the functional modules in the master BMU include a master control switching module 6031, an access gateway functional module 6035 together with a ToP (timing over packet) server 6033 and a centralized network management functional module 6032 which are connected with the master control switching module 6031, and a clock source 6034 connected with the ToP server 6033. Wherein The master control switching module 6031 has a communication interface, which interacts with access points attached to the BMU and/or other master control switching modules, to process and forward data (including user-plane data, clock data and the like) and signaling interaction of base stations attached to the BMU. If it is necessary to bind multiple base stations to form a logical WiMAX channel, the master control switching module further completes the centralized processing function of MAC and layer-3 protocols of the logical channel.

The centralized network management functional module 6032, also called a network management agent module, is used for processing the operation and maintenance information of the BMU.

The clock source 6034 may be a built-in GPS receiver or another clock module configured in the BMU as the substitute of the GPS receiving module for generating timing information, however, the timing information also can be generated by inputting an external synchronous clock source; in view of the above, this module is optional.

The ToP server functional module 6033, also called a ToP server, is used for distributing clock information to multiple ToP clients. Of course, this invention can employ other timing servers.

The access gateway (AGW-Lite) functional module 6035, also called a small-capacity access gateway, is optionally integrated in the master BMU 603 for converging access information of base stations and processing tunnel protocols, providing an R3 interface to a core network CSN and the internet, and at the same time, providing routing switching-related information to a corresponding centralized access gateway, wherein the above-mentioned functions are similar to those of the centralized access gateway. The AGW-Lite also has functions of local wireless resource processing and self-routing for local flows, and completes the ending of tunnel processing on an attached base station, the flow shaping and flow control on multiple attached base stations and the data stream scheduling processing based on a base station.

In this scene, the Pico BSs of Floor N and Floor N+1 are counted and deployed in a PUSC (partially used sub-channel) Segment manner or PSCH ALL Sub-channel manner according to the telephone flow of users; for a coverage-limited area, the PUSC Segment manner is used for networking to increase the utilization efficiency of frequency spectrums. The sub-channel distribution among Pico BSs can be generated automatically on the BMU side according to the relative location relations among the Pico BSs, thereby reducing the engineering commissioning and maintenance time required for independently configuring each Pico BS with sub-channels, facilitating the fast and economical networking of the operator, and lowering the operating expanse (OPEX) of the operator.

A logical cell group formed by physically separated Pico BSs is supported in the embodiment, for example, it can be supposed that Pico BS A, Pico BS B and Pico BS C in FIG. 6 form logical cell group 1, while Pico BS D and Pico BS E form logical cell group 2, wherein the Pico BSs in the same cell group share different sub-channels of the same WiMAX Channel, and different WiMAX Channels are distributed to different cell groups. The BMU distributes sub-channels according to the location relations among the Pico BSs subordinate to the cell groups 1 and 2, and meanwhile, guarantees the interference among the Pico BSs A-E to be minimized.

For a coverage-limited area, a Pico BS can be used as a signal source, a coupler or power divider 604 and a passive distributed antenna system 605 can be used to expand the coverage area, and the coupler or power divider 604 is connected with the passive distributed antenna system 605 via a radio frequency cable.

FIG. 6C is a scheme diagram of the deployment of a BMU connected to access points via power lines that are used as transmission resources according to another embodiment, which, complementary to FIG. 6A, makes the transmission between a Pico BS and a BMU based on power lines become possible, and is applicable to the case where it is impossible to add wiring to a planned Pico BS.

In this scheme, the master BMU 603 is connected with a slave BMU 602c via its cascade interface, and the slave BMU 602c may further be cascaded with one or more BMUs 602c in order, certainly, other modes such as star networking and tree networking are also supported. The slave BMU is used for realizing a relay function for power line transmission between the master BMU and the Pico BSs managed by the BMU and a routing and forwarding function for data and timing information. The master BMU and the slave BMU are interconnected via available transmission resources such as optical fibers or twisted pair cables. The slave BMU is connected with the managed Pico BSs via power lines. Similar to the former embodiment, a logical cell group formed by multiple physically separated Pico BSs is supported in this embodiment, no more description is given here. If there are few attached access points, the slave BMU can be saved and a power line is directly used as the transmission medium between the master BMU and the attached access points.

Figure 6D:
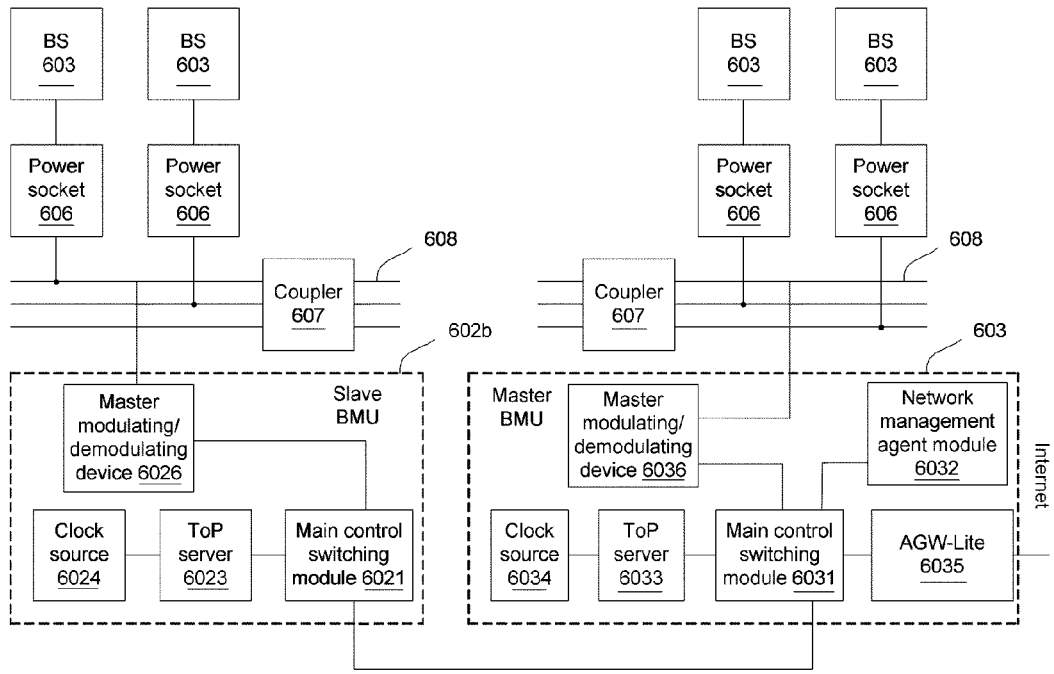
FIG. 6D is another schematic diagram of a WiMAX access point management system in FIG. 6B, illustrating the modules of a master BMU and a slave BMU, and the power line connection manner between BMUs and Pico BSs.

FIG. 6D also illustrates the WiMAX access point management system identical to FIG. 6B, which specifically illustrates the modules of the master BMUs and the slave BMUs and the connection between the slave BMU and the Pico BS via a power line. The Pico BS 601 can be handily arranged nearby a power socket 606, and the data transmission and the power supply between the slave BMU and the Pico BS are carried out over a power line 608. Considering the complexity of indoor power line deployment, different phase currents can be accessed for different rooms and floors, the three-phase currents of the same transformer are coupled by a coupler 607, which is beneficial for the fast and simple deployment of engineering.

The functional modules configured in the master BMU include: a master control switching module 6031, a small-capacity access gateway 6035 together with a ToP server 6033, a network management agent module 6032 and a power line transmission interface module 6036 which are connected with the master control switching module 6031, and a clock source 6034 connected with the ToP server 6033. Compared with the master BMU in the former embodiment of FIG. 6B, this embodiment adds a power line transmission interface module 6036 which is implemented by a master modulating/demodulating device and is configured between the master control switching module and the power line for completing a power line transmission function, a link detection and adaptive processing function, and providing a synchronous state to the master control switching module as a basis for the subsequent processing. In addition, based on the former embodiment, a function of cascading BMUs is required to be added to the master control switching module 6031. The ToP server is further used for receiving synchronous state information from each ToP client and distributing synchronous state information of neighbor cells to each ToP client. The functions of other modules can be obtained by referring to the former embodiments.

Compared with the master BMU 603, the slave BMU 602b includes neither the network management agent module 6032 nor the small-capacity access gateway 6035, that is, the functional modules configured therein only include a master control switching module 6021, and a ToP server 6023 and a power line transmission interface module 6026 connected with the master control switching module 6021, and optionally include a clock source 6024 connected with the ToP server 6023. The functions of each module can be got by referring to those in the master BMU.

Based on the above-mentioned network architecture, a synchronization method of the present invention is illustrated in detail below.

In order to lower the requirements of the Pico BS on process installation and maintenance and the cost thereof, in this embodiment, a GPS clock generation module such as a GPS receiver is arranged on the BMU side to generate PP1S (industrial signal measurement converter) timing information. The configuration of the GPS module in the BMU reduces the difficulty and the cost in the configuration of the GPS receiver on the base station side and is beneficial for fast networking and decrease in initial investment and maintenance cost. The generated timing information is distributed to each Pico BS via Ethernet packets, then the Pico BS restores the timing information. Specifically, for a scene in which the transmission between the BMU and base stations is based on power lines, ToP timing information packets sent by the ToP server are transmitted to Pico BSs via a master control switch and a master modulating and demodulating device. For a scene in which the transmission between the BMU and base stations is based on optical fibers or twisted pair cables, ToP timing information packets sent by the ToP server are transmitted to Pico BSs via a master control switch and a switch.

Figure 7:
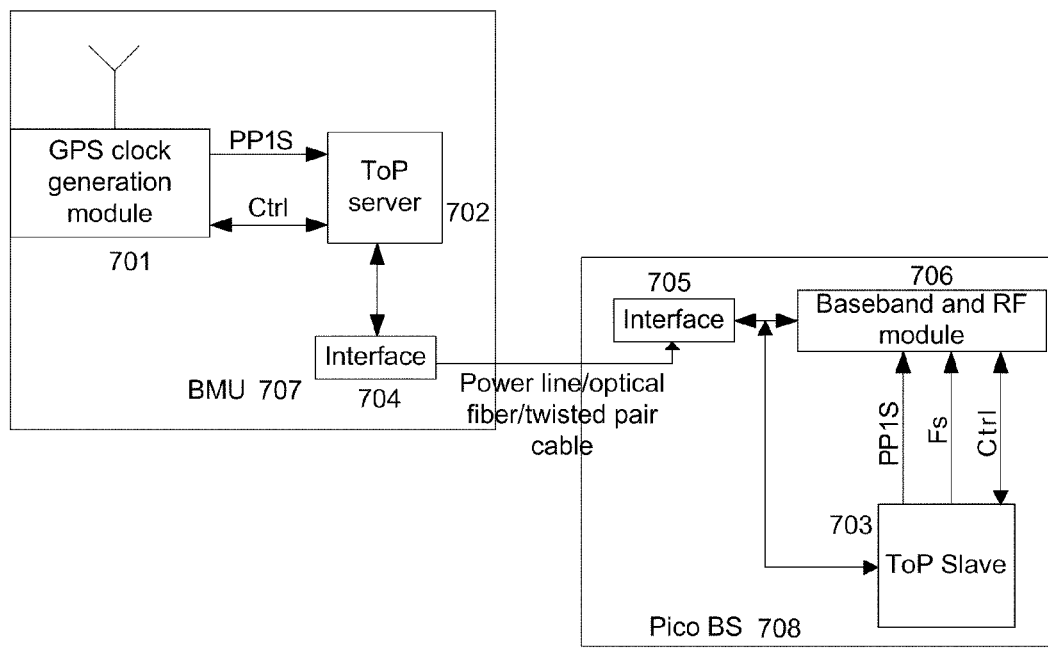
FIG. 7 is a schematic diagram of a timing sub-system for realizing a timing mechanism between a BMU and a Pico BS.

FIG. 7 is a schematic diagram of a timing sub-system for realizing a timing mechanism between a BMU and a Pico BS, wherein a GPS clock generation module 701 and a ToP server 702 connected with the GPS clock generation module 701 are included in a BMU 707, the ToP server is connected with a Pico BS via a network interface 704 on the BMU side, and the interconnected modules on the Pico BS side, i.e. a network interface 705, a ToP receiving module (or called ToP client) 703 and a baseband and radio frequency module 706 are included in the Pico BS 708, wherein:

the GPS clock generation module 701 is the timing reference of the whole system and outputs reference timing signals to the ToP server 702, wherein the reference timing signals include PP1S signals and other related information (for example: TOD and location information);

the ToP server 702 generates a hardware timestamp according to a reference timing signal and sends a ToP timing information packet to the Pico BS via the network interface 704 on the BMU side and the network interface 705 on the Pico BS side according to the address information of each Pico BS;

the ToP receiving module 703 makes a jitter and delay estimation according to a timing information packet received by the network interface 705 on the Pico BS side, restores a timing signal and outputs the timing signal to the baseband and radio frequency module, wherein the timing signal is used as a reference timing signal of the baseband and radio frequency module 706.

In this figure, Fs represents a sampling frequency; PP1S represents pulse signals per second; and Ctrl represents control information, such as a locked state and a link state of the ToP module and the like.

The timing restoration mechanism reduces the difficulty and the cost in the configuration of the GPS receiver on each base station side and is beneficial for fast networking and decrease in initial investment and maintenance cost.

Further, this embodiment may adopt one or a plurality of optimizing measures for ToP synchronization as follows.

Guarantee for Network QoS (Quality of Service)

In order to guarantee the clock restorability on the ToP receiving module side to be in a stable and optimized state, when a defaulted QoS policy is set on an EMS (element management system) server side, the message priority related to ToP information is set to be equal to that of real-time data or to be a highest priority, and is synchronized to the BMU side and the Pico BS side to statistically guarantee that delay and jitter are in a rational range. Timing information is marked as a specified QoS type in the ToP module (including a ToP server and a ToP client), the implementation of a scheduling policy based on QoS label information is guaranteed on the BMU side and the base station side, and the timing information is distributed and routed according to the real-time service requirements; guaranteed bandwidths are set for the uplink and the downlink of each Pico BS node through a network management to guarantee a enough bandwidth for reliable transmission of ToP information. Moreover, a dedicated hardware coprocessor can be used in the Pico BS to realize extraction and processing to reduce the uncertain delay and influence caused by software.

Optimization for the Convergence Rate of ToP

As network loads have much influence on the convergence rate of the current IEEE1588, it is considered to employ the following scheduling mechanism to optimize the convergence rate of ToP, mainly using the following measures: when powered and initialized, a ToP server synchronous packet on the BMU side is sent in the form of the shortest packet in a sub-network through broadcast. For messages of this type, the processing policy of the main control switching module of the BMU is prior to all other services; for a specified Pico BS node, a flow control mechanism is optionally started as long as the BMU side is not synchronous with the Pico BS node, to minimize the jitter and delay caused by the congestion of non-control plane information, to guarantee the reliable transmission of the ToP information and the network load in a rational load range (60%-70%) during the initial synchronization of the ToP, namely, the influence caused by burst messages or network congestion is avoided; and after being synchronized, the BMU and the Pico BS send data packets normally.

Synchronization Processing Mechanism for a Newly Added SLAVE Node:

In an initial access state, a Pico BS SLAVE node that is newly added into the network only makes basic ToP messages and state configuration information transmitted between the master BMU and itself, but does not transmit or bear media plane data, thereby eliminating congestion and accelerating synchronization; the BMU determines whether the base station can be normally powered and started according to the feedback on the synchronous state information of the Pico BS and establishes a media stream path; and the master BMU regulates the transmission frequency of the ToP messages according to the synchronization performance of all the nodes in the sub-network when the bandwidth occupation rate of data transmission of all the nodes is smaller than a given threshold so as to optimize the synchronization performance.

Optimization Using a Digital Synchronous Phase-Locked Loop Algorithm:

A big jitter and flutter in an Ethernet are removed by using a loosely coupled phase-locked loop algorithm, a narrowband loop algorithm and an adaptive filter algorithm; the synchronization quality of the network is automatically detected by using an adaptive HOLDOVER algorithm. A HOLDOVER state is automatically switched to when the quality of the network deteriorates. The control parameters in the optimal synchronization condition can be automatically memorized by using the HOLDOVER algorithm adopting a learning and training method. And in the HOLDOVER state the memorized parameters are used to refresh control parameters to make the system have an excellent maintenance performance.

Network Management and Processing Mechanism for Synchronization Performance:

Since the WiMAX system has a high requirement on the network synchronization performance, if one node is out of synchronization, the time sequence of TDD will be disordered, consequentially, the interference with the whole system will be increased and the performance of the whole system will be sharply deteriorated. For this reason, when a network management foreground agent detects a performance degradation in a node, the system control applies an anomaly processing mechanism to the node by means of real-time monitoring for synchronization state of each node to reduce the transmitting power of the node and decrease the coverage radius of a cell, thus decreasing the interference with neighbor cells; if the network synchronization performance is not restored after a given time, the RF output of the base station will be automatically closed and the background will be alarmed to notify related personnel.

Further, the BMU can initiate an initialization flow on the abnormal nodes of this sub-network in idle time (for example: before dawn) according to the network load condition to accelerate the synchronization restoration of the nodes.

A flow control mechanism will be described in detail in the following text.

In order to complete the synchronization management on base stations effectively, neighbor cell information of base stations subordinate to the BMU, default parameters of TTG (transmit/receive transition gap) and RTG (receive/transmit transition gap) of the base stations subordinate to the BMU and default parameters of the de-rated power of the base stations should be locally kept and stored in the BMU and are sent to the base stations by the BMU. The BMU and the base stations update synchronization state information regularly, so that the base stations subordinate to the BMU can uniformly carry out effective and reliable scheduling processing. The BMU assists the base stations in completing dynamic scheduling and configures a TDD uplink-to-downlink ratio of the base stations and time sequence parameters of the RTG/TTG uniformly. Normally, the base stations adopt a universal scheduling mechanism.

Figure 8A:
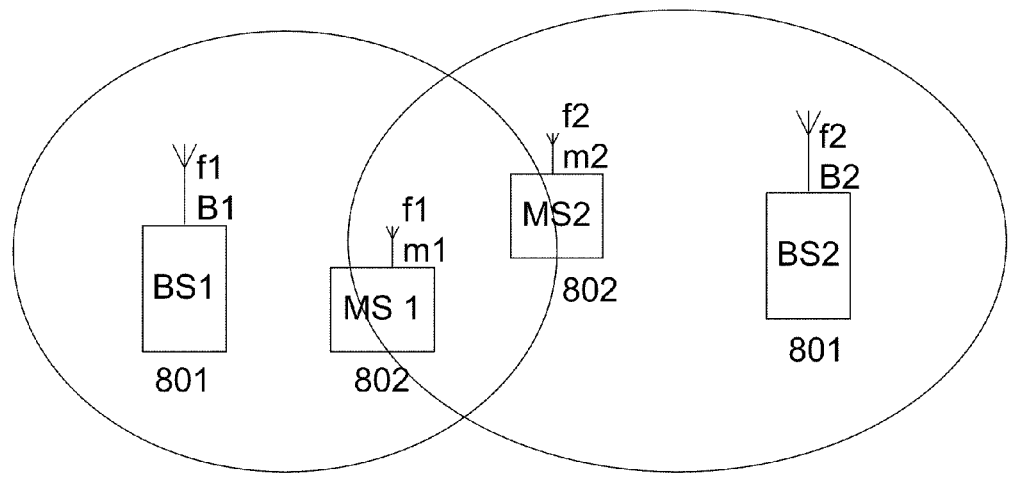
FIG. 8A is a schematic diagram of networking of neighboring base stations in one application example.

As shown in FIG. 8A, BS 1 and BS 2 are two neighboring indoor base stations; as same-frequency networking unavoidably causes interference in neighboring areas, different-frequency networking is recommended; assuming that each base station works at a different frequency, BS 1 working at frequency f1 and BS 2 working at frequency f2, MS 1 and MS 2 are two terminal users in the neighboring areas, the MS 1 is accessed at the BS 1, and the MS 2 is accessed at the BS 2; if the BS 1 and the BS 2 are not synchronous with each other or the synchronization precision between the BS 1 and the BS 2 is very low, there may be interference between signals of neighboring base stations or even between terminals, which disenables the normal running of the system.

The interference is classified into the following two types:

(1) stray interference between neighboring devices, which reduces the sensitivity of neighboring base stations;

(2) strong interference between neighboring devices, which causes a block in a receiver due to the out-of-synchronization between the devices.

Specifically, the interference is classified into the following types:

(1) downlink interference caused by the BS 1 to the MS 2;

(2) interference with an uplink receiving link caused by the BS 1 to the BS 2;

(3) downlink interference caused by the BS 2 to the MS 1;

(4) interference with an uplink receiving link caused by the BS 2 to the BS 1;

(5) transmit/receive interference between the MS 1 and the MS 2.

According to the analysis on all kinds of networking, the 802.16e RCT test specification requires the timing precision of +/−1 μs between neighboring base stations, that is, all base stations are required to have a GPS receiver. For indoor coverage, it is almost impossible for all base stations to have a GPS receiver and an antenna system. A specific indoor coverage scene is as follows: for an indoor coverage system, there is much multi-path transmission, while the multi-path delay is small, generally below 5 μs if an indoor coverage radius is 100 m. According to the RCT test specification, in a 5/10 MHz system, RTG is set to 60 μs and TTG is set to 105.7142857 μs to properly lower the timing precision requirement of an indoor coverage base station to +/−20 μs at least.

Figure 8B:
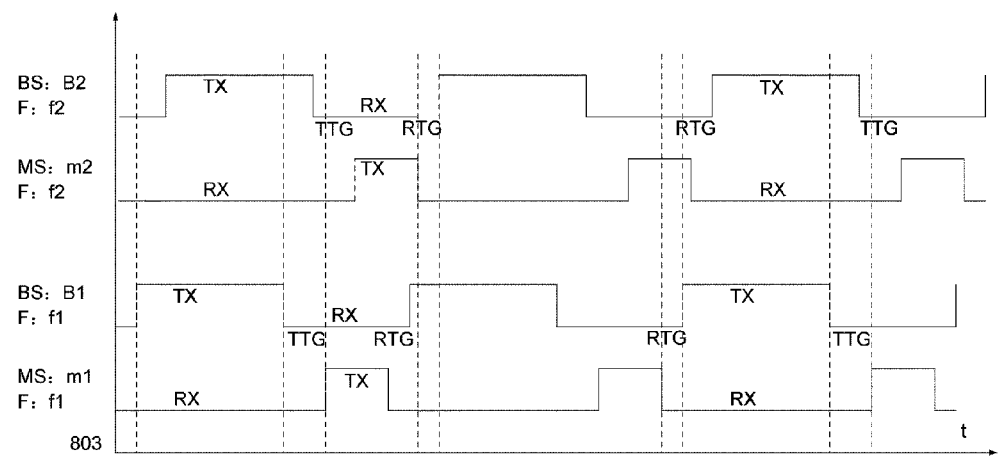
FIG. 8B is a schematic diagram of precision requirements defined by an indoor coverage system based on power line transmission.

When the precision of +/−20 μs is needed, timing information is sent and restored between a BMU and a base station by using a ToP method. In a case where ToP timing information is transmitted via Ethernet, system timing can reach a precision range of +/−(1-5) μs and even a precision range of +/−20 μs when link deterioration happens, which can meet the requirements on system performance and network construction. In a case where ToP timing information is transmitted via power lines, the system performance is relatively complicated, the timing can reach a precision range of +/−20 μs when a link is normal or a precision range of +/−(30-50) μs when the quality of a link is deteriorated, in this case, the system may not work normally when the RCT specifies that the RTG is 60 μs. As shown in FIG. 8B, although the B1 and the B2 use different frequencies, considering the design principle of pre-filters of the base stations, especially that one operator possesses a continuous frequency spectrum, the B1 and the B2 both employ wide-band filters occupying continuous bandwidth; the uplink of the MS 2 may bring in-band interference to the BS 1, and when the in-band interference is serious, the receiving sensitivity of the system will be severely reduced.

Figure 9:
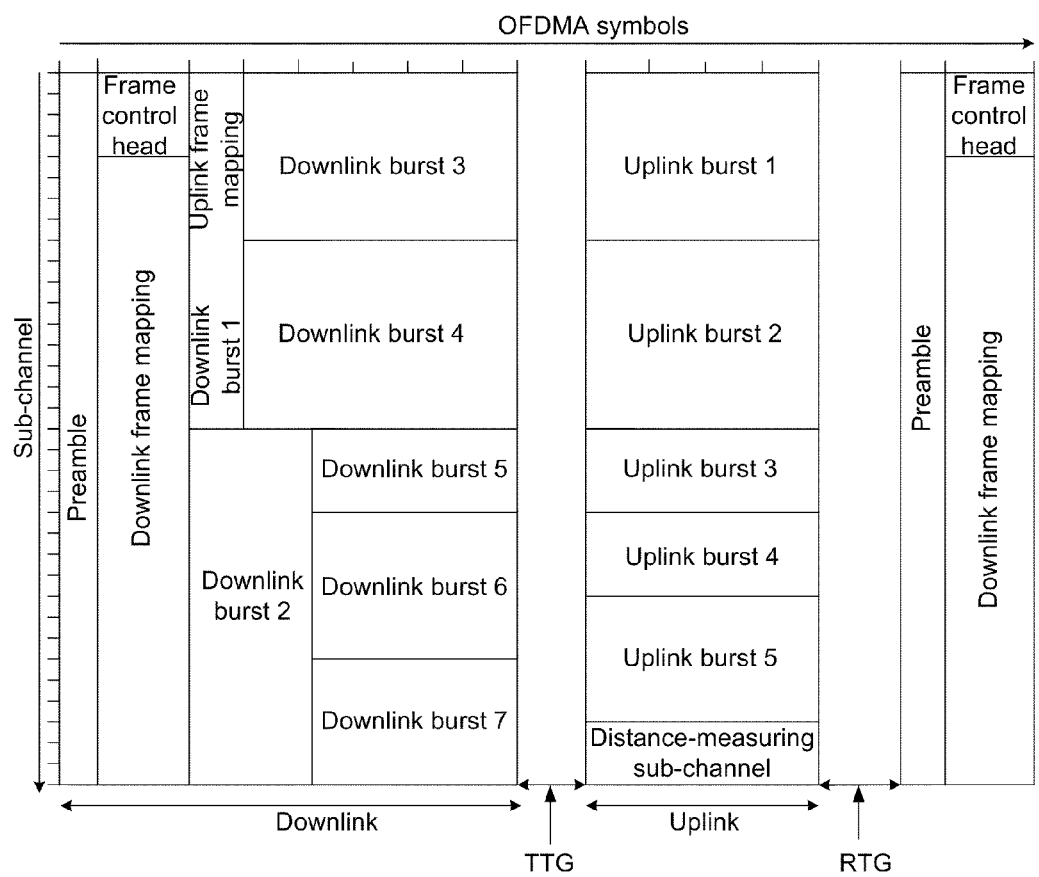
FIG. 9 is a schematic diagram illustrating the frame structure of a WiMAX TDD system based on 802.16e.

FIG. 9 is a schematic diagram of a frame format of a 802.16e-based WiMAX TDD system, in which the frame format is defined based on two dimensions: time and frequency (sub-carrier). In 802.16e protocol, a frame generally has an optional frame length definition according to time dimension, e.g. 2 ms, 5 ms and 10 ms, and also has different sub-carrier quantity definitions (e.g. 512 sub-carriers corresponding to a bandwidth of 5 MHz and 1024 sub-carriers corresponding to a bandwidth of 10 MHz) according to different channel bandwidths (for example 5 MHz and 10 MHz). Sub-carriers form a sub-channel group according to a given replacement mode; a sub-channel includes a certain quantity of sub-carries, for example, for a bandwidth of 10 MHz, one downlink sub-channel includes 24 data sub-carriers, 4 pilot sub-carriers and 30 available data sub-channels; an uplink frame consists of 35 sub-channels and each sub-channel consists of 24 sub-carriers; the rest of the uplink and the downlink are guard sub-carriers.

The system is a TDD system, in which the uplink and the downlink of the same channel adopt the same frequency, a time division multiplex manner is adopted, and the symbol bandwidths of the uplink and the downlink are different according to different symbol ratios. Considering the requirement on the interconnection of the system and a terminal, the switching requirement on working modes of a transceiver and wireless transmission and the like, an RTG and a TTG are required to be preserved in a signal transmit/receive transition period of a base station to guarantee the normal switching of the system. It is specified in 802.16e RCT (radio conformance test) specification that the RTG is set to 60 μs and the TTG is set to 105.7142857 μs in a 5/10 MHz system.

As shown in this figure, in a downlink frame, the first symbol, as the fixed system overheads, is a preamble area, and is used for terminal synchronization; in a PUSC replacement mode, a slot is formed by 2 symbols*1 sub-channel in areas except the preamble area; the slot is the basic unit for multi-user scheduling in a downlink system; according to the sizes of different protocol data units (PDU) to be transmitted and the requirement on QoS, the system distributes and combines different downlink Bursts to meet the requirement on the system performance. In an uplink frame, a similar mode is adopted, and the difference only lies in that a slot is formed by 3 symbols*1 sub-channel in an uplink PUSC replacement mode.

In transmission based on power lines, an optimized adaptive uplink scheduling algorithm is adopted; based on a flow control mechanism of a base station and the BMU and an end-to-end QoS mechanism between the base station and the BMU, the last N symbols can be marked as unavailable when the signal quality is deteriorated to avoid uplink Burst signal transmission performed by distributed terminals in the slot interval of the last N symbols, in this way, the maximum system transmit/receive guard period is Min (TTG, RTG+$N*T_{symbol}$), as a consequence, the requirement on the timing precision of the system is reduced, the interference among terminals and between terminals and base stations is further avoided, the reliability of timing information is guaranteed, and the robustness of the system is improved.

For a 802.16e system of 5 MHz/10 MHz, when a 5 ms frame and 1/8CP (cyclic preamble) are adopted, $T_{symbol}$ is 102.8571 μs; if the symbol ratio of uplink to downlink is 31:16, N may be 1, that is, the guard period is Min (TTG, RTG+$1*T_{symbol}$)=TTG=105.7142857 μs; except one uplink symbol that is free of scheduling, there are 31 downlink symbols and 15 uplink symbols scheduled, meeting the requirement on the PUSC replacement mode, additionally, there is almost no change in uplink frequency spectrum efficiency. For other symbol ratios, N can have a higher value, but it is meaningless because the TTG has limited the further expansion of the guard period. After adopting an adaptive scheduling algorithm, the maximum timing precision allowed in the base station system is 50 μs, which greatly improves the anti-interference performance of the system.

Figure 10:
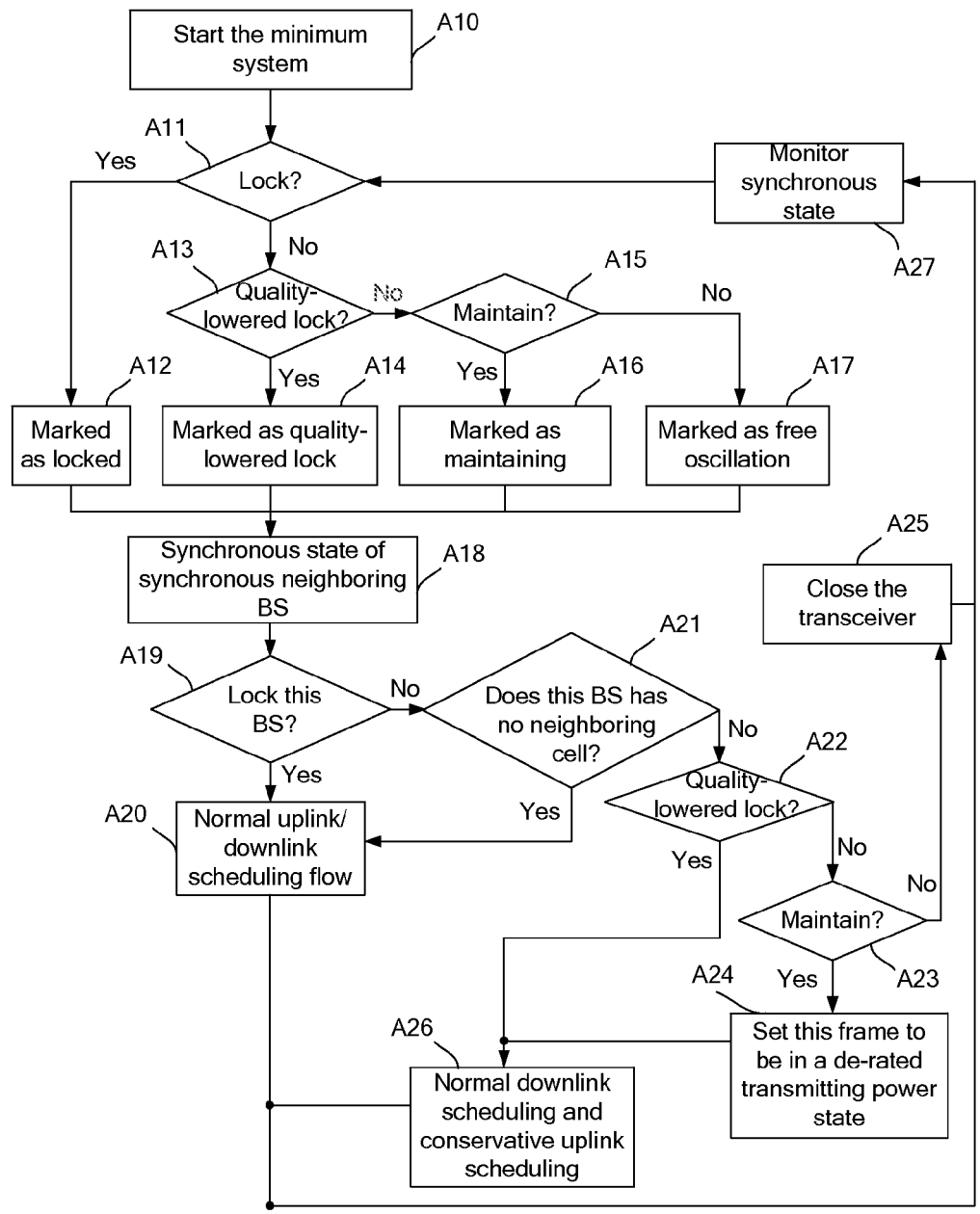
FIG. 10 is a schematic flowchart of a synchronous-state scheduling method based on power line transmission.

FIG. 10 is an example of a scheduling method for clock restorability based on power lines, in which multiple synchronous states and corresponding scheduling modes are configured on a base station, and a determination condition related to timing precision is also configured for each synchronous state. In this example, the synchronous states of clock restore circuits of the timing clients of the base station (also called the synchronous states of a base station) are classified into multiple types, and each state and the determination method thereof are as follows:

if the timing algorithm of the system is fully converged and the timing precision (calculated according to the convergence condition of the timing algorithm) is higher than $t_1$ (the default value of $t_1$ is 20 μs), then the state is determined to be a locked state, that is, the base station is synchronous with the BMU; otherwise, it is considered that the base station is not synchronous with the BMU;

if the timing algorithm of the system is not converged completely and the timing precision is lower than $t_1$ but higher than $t_2$ ($t_2>t_1$, and the default value of $t_2$ is 50 μs), the state is determined to be a quality-lowered locked state;

after the quality-lowered locked state is maintained for a given period $T_1$, it is determined that the state goes into a maintaining state;

after the maintaining state is maintained for another period $T_2$, it is determined that the state goes into a free oscillation state; and if the timing precision is lower than $t_2$, it is directly determined that the state goes into a free oscillation state.

As shown in FIG. 10, a scheduling method for clock restorability based on power lines comprises the following steps:

step A10, when a base station is started, carrying out a power-on self-test and a normal starting process in a minimum system, including transmitting and restoring timing information between a BMU and the base station using a ToP method;

the minimum system does not include a transmitter part of the base station in order to prevent interference with other base stations caused by the adoption of an unreasonable frequency in the power-on process;

step A11, after the minimum system runs normally, detecting the synchronous state of a ToP client by the base station, performing step A12 if the state is a locked state, otherwise, performing step A13;

step A12, marking the synchronous state as locked and performing step A18;

step A13, determining whether the synchronous state of the ToP client is a quality-lowered locked state by the base station, if yes, performing step A14, otherwise, performing step A15;

step A14, marking the synchronous state as quality-lowered locked and setting a scheduling mechanism to be conservative scheduling, carrying out uplink conservative scheduling, and then performing step A18;

step A15, further determining whether the synchronous state of the ToP client is a maintaining state, if yes, performing step A16, otherwise, performing step A17;

step A16, marking the synchronous state as maintaining and setting a scheduling mechanism to be conservative scheduling, carrying out uplink conservative scheduling, and then performing step A18;

step A17, marking the synchronous state as free oscillation, and setting the default state of the transmitting link of the base station to be closed, maintaining normal communication of the network link of an R6 interface, reporting alarm information in time so that a network manager can locate faults and maintain the system, then performing step A18;

step A18, reporting, by the base station, state information to a master BMU; notifying, by the master BMU, subordinate base stations of neighbor cell information of the base station which, besides information on neighbor cell existence, further includes synchronous state information of the neighbor cell and synchronous state information used for synchronous neighboring base stations;

after receiving the neighbor cell information, the base station performs the following steps:

step A19, determining whether or not the base station is in a locked state, if yes, performing step A20, otherwise, performing step A21;

step A20, performing normal uplink and downlink scheduling, wherein all uplink symbols are in available states and transmit/receive links work normally, and then performing step A27;

step A21, determining whether or not the base station has a neighbor cell, if yes, performing step A22, otherwise, performing step A20;

step A22, determining whether or not the base station is in a quality-lowered locked state, if yes, performing step A26, otherwise, performing step A23;

step A23, determining whether or not the base station is in a maintaining state, if yes, performing step A24, otherwise, performing step A25;

step A24, setting the maximum transmitting power to a de-rated state, for example, reducing 6 dB (decibel), with a specific policy being configured in background, and then performing step A26;

step A25, turning off a transceiver if the system does not work in an isolated island state and the synchronous state is in a free oscillation mode, maintaining normal working of the R6 interface link, returning to step A11 and performing step A11 until the system is restored to normal;

step A26, normally carrying out downlink scheduling of the base station, marking the last N symbols of the uplink as unavailable, getting into uplink conservative scheduling, and then performing step A27; and step A27, continuing to monitor the clock state of the system and returning to step A11.

After the synchronous state of the base station is determined in steps A19, A22, A23 and A25 above, if the determined synchronous state is different from the former synchronous state of the base station, an update should further be made on the synchronous state.

The state detection is carried out regularly, and the update and the execution of scheduling policies are carried out by taking a frame as a minimum execution cycle.

In order to realize the scheduling above, a ToP client of an access point should include:

a configuration information storage unit for storing multiple configured synchronous states and corresponding scheduling mode information and a determination condition of each synchronous state related to the timing precision;

a timing signal restoration unit for restoring a timing signal according to received timing information, outputting the restored timing signal to a baseband and radio frequency module, and at the same time, outputting a convergence condition of a timing algorithm to a synchronous state determination unit;

a synchronous state determination unit for determining the current timing precision according to the convergence condition of the timing algorithm, determining the current synchronous state in combination with the configured synchronous state determination condition, and outputting the determined synchronous state to a scheduling control unit; and a scheduling control unit for determining a corresponding scheduling mode according to the current synchronous state and carrying out the scheduling mode.

It can be seen from the example for the scheduling method above that when the quality of transmission via power lines is continuously abnormal, the timing precision of a base station will be reduced, in this case, the BMU side unifies scheduling policies and coordinates scheduling mechanisms of the managed WiMAX base stations to minimize the interference among base stations and guarantee the reliability of the transmission. The improvement on performance of services among the base stations attached to the BMU greatly raises a key performance indicator (KPI) of an indoor coverage network, including delay reduction, jitter reduction and the reduction in switching interruption and completion time, thus upgrading customer satisfaction. When the local timing precision is severely degraded or even becomes unavailable, the reduction in the quality of the whole network can be avoided by lowering the transmitting power or even closing the base station.

It should be noted that the state configuration and the corresponding scheduling modes are only examples, in other embodiments, the quality-lowered locked state and the maintaining state can be combined into one state, in which the last N symbols of the uplink are marked as unavailable. Moreover, the names of the states mentioned above are not limited to those in this embodiment because names are only used to distinguish the states with different timing precisions.

Flow Control

For a transmission scene based on power lines, Pico BSs attached to a slave BMU actually refers to a mechanism (for example: a TDMA or CSMA technology) of sharing the bandwidth of power lines, and there is a possibility of burst interference, while a network between the BMU and the network side is a robust transmission network with high bandwidth and high reliability, therefore, a potential asymmetry feature exists between an R3/R4 interface and an R6 interface. If one Pico BS has a high burst flow, then flows of other base stations attached to the BMU may be blocked, which makes the network crashed.

In order to guarantee the performance of transmitting timing information, control plane information and user plane information over Ethernet and power lines, a master BMU and Pico BSs are required to support flow control functions and the match between the policy definition of synchronous Ethernet QoS and that of power line QoS, so as to guarantee that the processing mechanisms of power line networks and Ethernet networks are capable of effectively guaranteeing reliable and prior transmission of ToP packets. According to system indexes and performance requirements, the BMU and the Pico BSs are configured with flow control parameters and other parameters such as QoS information corresponding to timing data, to control plane data and to user plane data. An end-to-end flow control can be realized on the Pico BS side and the BMU side; and tests prove that the transmission performance of an R6 interface and timing information can be guaranteed well after the flow control mechanism is realized.

Figure 11:
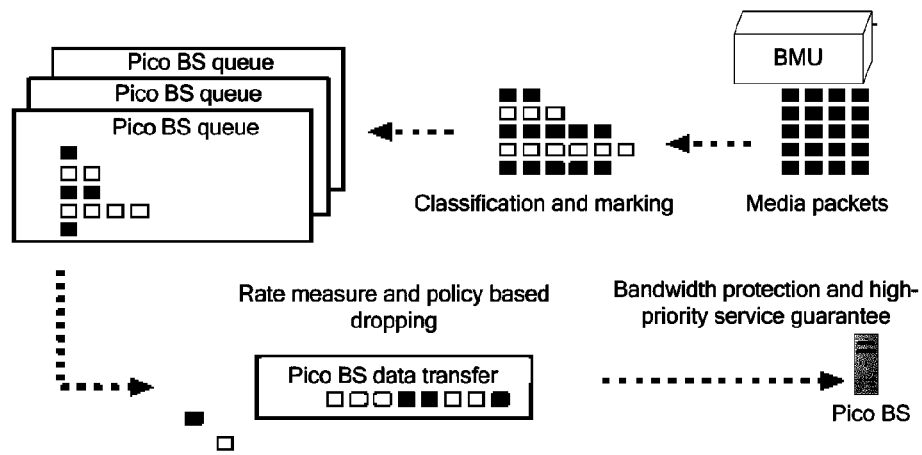
FIG. 11 is a schematic diagram of a flow control between a BMU and a Pico BS.

A method for controlling flows between a BMU and Pico BSs is illustrated below by referring to an example. FIG. 11 is a schematic diagram of a flow control between the BMU and Pico BSs. By adopting a principle of fairness, the BMU guarantees the equal opportunities of its attached Pico BSs for sharing network bandwidth, and provides a performance guarantee for services with high priority in the case of network congestion. When media grouping data arrives at the BMU, packets are classified and marked and then enter the queue of each Pico BS according to their destination addresses. A continuous rate measurement is realized in the distributing module of the BMU, and packets are normally routed to each Pico BS when there is no congestion; once congestion happens, a packet dropping mechanism based on a policy is carried out; the specific description is as follows:

a guaranteed bandwidth and a maximum available bandwidth are respectively set on an EMS side for the uplink and the downlink of each Pico BS;

the downlink flow control is carried out on the BMU side, and the BMU identifies and calculates the flow of each Pico BS; if the calculated flow of a Pico BS is in a given range of the guaranteed bandwidth, the data of the Pico BS is normally stored and forwarded; if the calculated flow of a Pico BS is out of the range of the guaranteed bandwidth but is still smaller than the maximum available bandwidth, the maximum residual bandwidth (e.g. the difference got by subtracting the downlink bandwidth used by the BMU from the maximum downlink working bandwidth of the BMU, or the difference obtained by subtracting the used downlink bandwidth from the product of the maximum downlink working bandwidth and a load threshold taking percentage as a unit) calculated by the BMU is distributed to an overloaded Pico BS queue by adopting a weighted average algorithm; and if the flow of the Pico BS is still overloaded, data messages of a BE (best-effort) service queue of the base station are discarded first;

the uplink bandwidth control is carried out on the Pico BS side, with a basic processing principle similar to that of the downlink, and the difference lies in that the Pico BS strictly guarantees that the distributed uplink flow does not exceed the maximum available bandwidth when it distributes a bandwidth to each terminal user according to the uplink bandwidth. If the BMU side detects that the total uplink bandwidth exceeds a load threshold (which can be configured by the EMS and is proved to be proper in a range of 70%-75% according to algorithm simulation and the experience values of actual tests) of its processing capacity, it identifies a candidate Pico BS list exceeding the guaranteed uplink bandwidth and sends a flow control message to the Pico BSs in the list to reduce the bandwidth to the given range of the guaranteed bandwidth on the Pico BS side.

Actual tests show that the flow control policy based on a BMU and a Pico BS can effectively avoid the congestion of the whole network and greatly improve the robustness of the system.

Network Management

Figure 12:
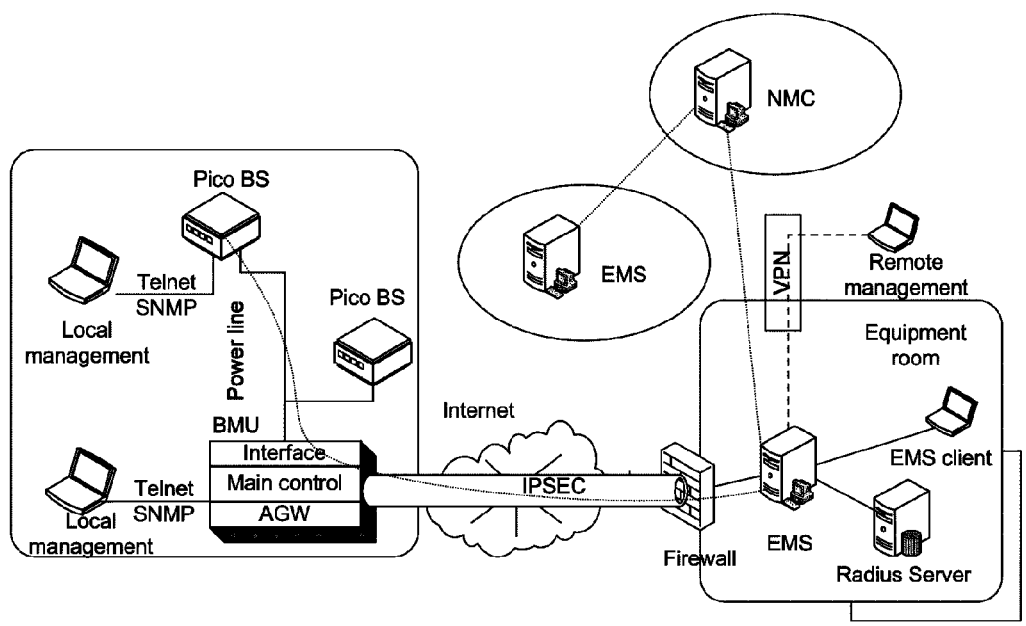
FIG. 12 is a schematic diagram of a network management system based on hierarchical WiMAX access points.

FIG. 12 is a hierarchy-based WiMAX access point management system. In an indoor coverage system, more than 10 or even dozens of Pico BSs 801 are generally required to be deployed at a site (for example, skyscraper, CBD commerce building), thousands of Pico BSs are needed to be deployed in a city; the conventional network management architecture adopts a centralized one, in which an EMS (element management system) server is arranged in a central equipment room, an off-site backup configuration manner is adopted for the sake of reliability, and multiple high-performance EMS servers are adopted to realize cascade and expansion in a load-sharing manner for the sake of performance expansion.

According to the conventional network management scheme, the performance requirements on the centralized network management are extremely high, including the requirements on real-time processing capability, network storm resistance capability and storage capability.

The present invention discloses a distributed network management system, which is based on a hierarchical BMU architecture, and realizes some of network management functions on the BMU side and the Pico BS side.

The network management of the present invention is divided into four parts: a local network management function of a Pico BS (realized by a network management agent module in the Pico BS), a local centralized network management agent function of a BMU (realized by a network management agent module of the BMU), a network management function of an EMS server and a network management function of an NMC (network management center).

In order to lower the requirements of the operation and maintenance of the Pico BS on the EMS server, network management agent modules reside in the foreground of the BMU and the Pico BS to realize the network management agent functions, the network management agent module of the BMU is used for interacting with the EMS and network management agent modules of the attached access points to realize the network management on this master access point management unit and the access points attached to this master access point management unit. The network management agent module of the Pico BS is used for interacting with the BMU to realize the network management function of this access point. The network management function includes one or more of the following: performance statistics, management and maintenance of software versions, alarm information processing, configuration management and fault dialogists, wherein:

the management and maintenance of software versions mainly includes the following operations:

1) the BMU and each Pico BS store their respective system configuration data in the form of a file which can be imported and exported; remote running maintaining of a system means that the EMS and the NMC store one copy of the file, the BMU and the Pico BS can be configured on site by operation and maintenance personnel to form a new profile, and the new profile will be uploaded to the EMS; in addition, the operation and maintenance personnel can check the system configuration of the BMU by remotely accessing a local equipment room network management unit via a VPN, namely, by accessing the EMS client in this figure, or check the system configuration of the BMU at the EMS client, and remotely update the system configuration if there is a problem in the system configuration of the BMU;

2) a BMU running maintaining system has a function of updating local and remote versions; the operation and maintenance personnel can update the system version on site or remotely update the system version of the BMU; the BMU can store two system versions, and will automatically roll back to the former version when a remote update is failed, thus, the applicability of the system is greatly increased;

3) during a remote version update, the EMS uniformly distributes the content of a new version to the target BMU, and controls version distribution and activation flows.

Compared with the conventional centralized network management architecture, the hierarchical network management structure improves upgrade efficiency, for example, providing that the EMS has 10000 attached Pico BSs, and, according to the hierarchical access point architecture, there are 500 BMUs, with each BMU having 20 attached Pico BSs, and 10000 copies of version data are required to be distributed if the EMS directly supports the version upgrade for 10000 base stations while only 500 copies of version data are required to be distributed in the hierarchical network architecture. After the version data is distributed to the BMU, the content of the new version related to Pico BSs is distributed to the attached Pico BSs by the BMU; the load of the backbone transmission network is thus reduced by 95%, and the majority of load is controlled within the local area network consisting of the BMUs and the Pico BSs, where bandwidth is always enough and QoS is guaranteed, thus, the performance and the reliability of the hierarchical network management structure are greatly improved in terms of version management.

Performance statistics mainly includes the following operations:

1) the BMU can collect the running condition of wireless service resources of the attached base station system in real time and dynamically observe and track the use condition of system resources and user services to control and manage system resources;

2) the BMU can check the application of radio frequency resources of one Pico BS and check and update the transmitting power of the radio frequency to make a proper adjustment to the coverage area according to the requirements of networking;

3) the BMU automatically carries out a data analysis according to the running condition of the wireless resources in the performance statistics data: when one base station suffers wireless resource utilization overloading and congestion in a continuous period (which can be configured by the EMS, with a recommended default value of 7-15 days), an alarm on system capacity is sent to be used as an important base for a network manager to make a decision on whether to optimize the wireless resource configuration.

Alarm information processing includes the following operations:

1) the BMU collects system running state information of the attached base stations in real time, records abnormal information into a file once an anomaly is detected and uploads the abnormal data to the EMS, then operation and maintenance personnel can detect and diagnose the abnormal information on site or remotely; and the EMS diagnoses system faults according to related alarms and the reported abnormal information;

2) in order to resist a network alarm storm, an alarm screening option can be set by the filter (arranged between the EMS and the BMU) of the EMS to screen non-emergency alarm information which will be stored on the BMU side, and only important emergency alarms are notified to the EMS; according to the demand for fault locating, the EMS polls fault information reported by the BMUs in a given area and in a specified time, thus minimizing the load of the EMS server and the requirement on processing capacity of the EMS server.

A radius server is used to realize location management on Pico BSs to guarantee that legal Pico BSs access the network.

For the sake of security, an IPSEC (internet protocol security) mode is adopted between the network management center (EMS and NMC) and the BMU to carry network management information, and a firewall is arranged from the network management center to a public network.

The network management method provided in the present invention is capable of realizing a hierarchical management function, resisting network storms and realizing a distributed network management capacity expansion well.

Figure 13:
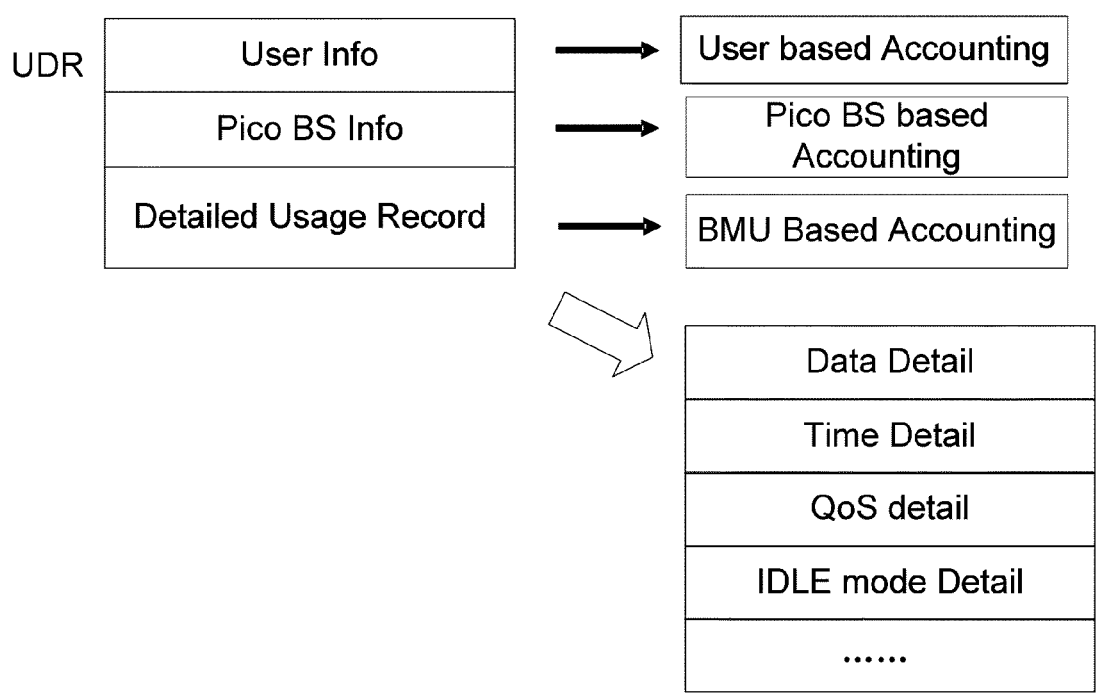
FIG. 13 is a schematic diagram illustrating an accounting policy of a wireless access system of the present invention.

FIG. 13 is a schematic diagram of an accounting policy of a wireless access system of the present invention. A flexible accounting policy can be defined on a CSN side based on a hierarchical access point management network architecture, including a user-based accounting policy, a Pico BS-based accounting policy, a BMU-based accounting policy and the like. The Pico BS-based accounting policy and the BMU-based accounting policy are applicable to enterprise networks. According to operation scenes and business strategies of operators, different accounting measures are defined in the BMU and an AAA (authentication, authorization and accounting) server, and the AGW-Lite module in the BMU generates accounting information including user information, a base station where a user is located and a detailed usage record; the detailed usage record includes information about data, time, QoS, idle mode and the like.

Figure 14:
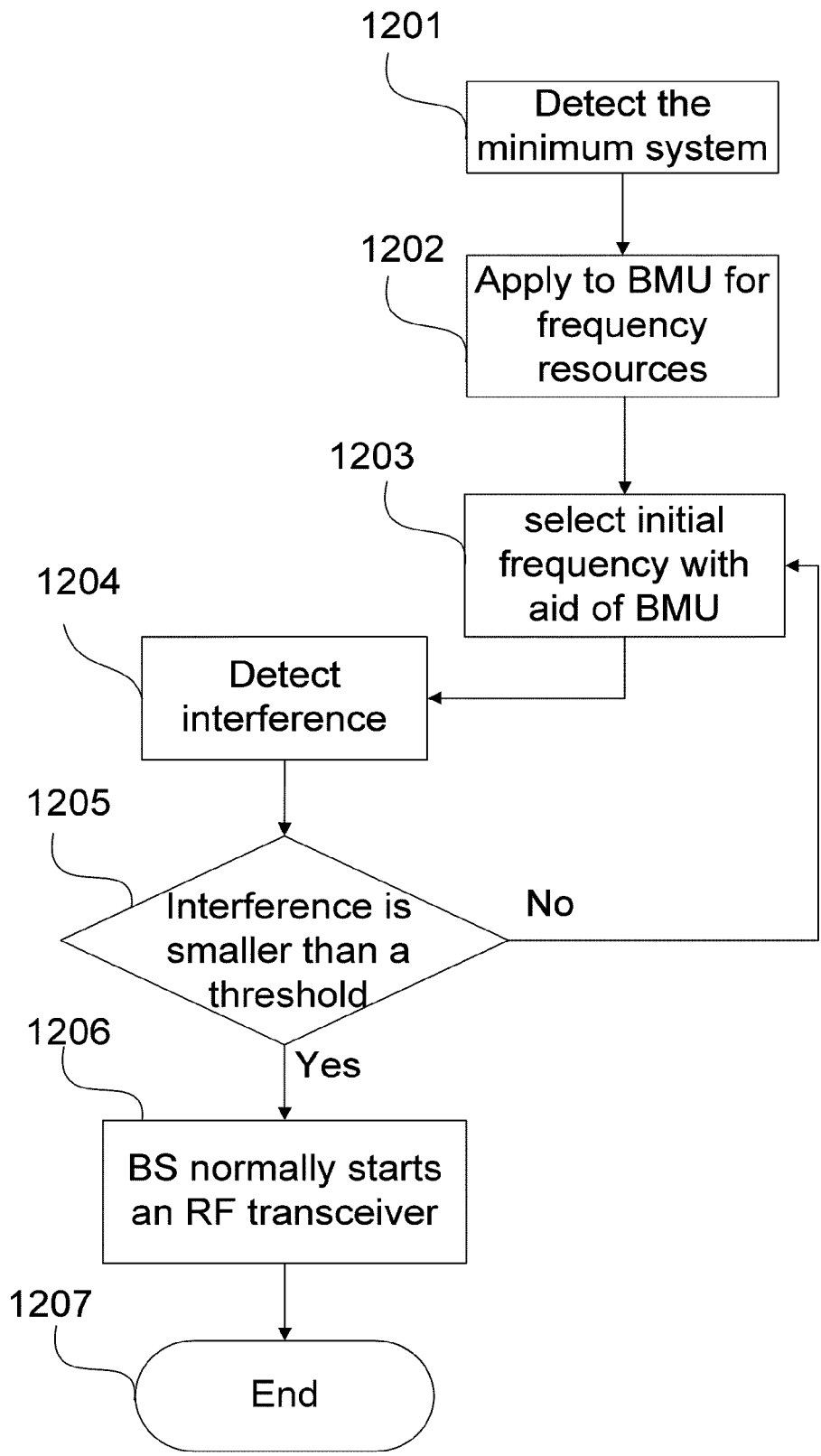
FIG. 14 is a flowchart illustrating automatic frequency distribution of a Pico BS in an embodiment of the present invention.

FIG. 14 is a flowchart illustrating the automatic frequency distribution of a Pico BS in an embodiment of the present invention, which mainly differs from conventional automatic WiFi frequency distribution in convenient realization of automatic configuration and management with the aid of a master BMU.

On a base station side, it is necessary to acquire a legal frequency resource list forwarded by a background EMS server via a BMU so as to enable correct frequency distribution, and specifically, the frequency distribution includes the following steps.

Step 1201, when a Pico BS system is started, a power-on self-test and a normal starting process are carried out on a minimum system, wherein the minimum system does not include a transmitter part of the base station for the purpose of preventing interferences with other base stations caused by the adoption of an unreasonable frequency in the power-on self-test process.

Step 1202, after the minimum system works normally, a handshake authentication process is initiated by the base station system to the BMU to apply legal frequency resources.

Step 1203, the BMU side assists each node subordinate to the BMU in selecting frequency resources mainly according to the neighbor relation among the base stations and sends the recommended candidate frequency to the base stations.

The frequency distribution of the base station with the assistance of the BMU is applicable to the following application scenes: (1) initial network construction, where the PUSC Segment is adopted to construct the network; (2) network capacity expansion, in which the number of base stations are increased and the re-distribution of frequency resources for the added base stations and existing base stations is taken into consideration; (3) capacity expansion for the base station, which is an upgrade from the PUSC Segment to the PUSC All Sub-Channel; and (4) a re-starting flow for the anomaly of the base station.

In the former three scenes, the EMS is required to synchronize with the BMU side after a frequency configuration is completed with its assistance, so that the BMU side can select a corresponding automatic processing policy. In the fourth scene, the processing policy adopted by the BMU is to send the stored historical frequency information of the base station back to the base station.

In the text below, it is defined that a Neighborlist ($BS_i$) is a neighbor cell list of $BS_i$, Freq ($BS_i$) is Freq/Seg (frequency/segment) configuration information of the $BS_i$, and Freq (BMU) is all the Freq/Seg resources the BMU can select.

The processing policy in the scene (1) is as follows: for a $BS_n$ in initial network construction, the BMU first acquires a Neighborlist ($BS_n$) of each $BS_n$; a $BS_i$ having the simplest neighbor relation is selected, which is often physically located on the edge of an area, with Freq/Seg ($BS_i$) randomly selected by a program; a frequency distribution program is automatically executed to determine Freq/Seg (BS∈ Neighborlist (BS$_j$)) in the Neighborlist (BS$_i$), based on the principle that neighboring base stations adopt different Freq/Seg; and an iterative program is executed until the frequency and segment information is distributed for all the base stations.

The processing policy in the scene (2) is as follows: for a newly added base station BS$_n$, the BMU acquires Freq (Neighborlist (BS$_n$)) according to the Neighborlist (BS$_n$); a frequency is randomly selected from the complementary set of Freq (BMU)∩Freq (Neighborlist (BS$_n$)) and sent to the BS$_n$, that is, a frequency different from that of the neighbor cell of the base station is selected from all the Freq/Seg the BMU can select and distributed to the base station.

The processing policy in the scene (3) is substantially identical to that in the scene (1), and the only difference lies in that the distributed frequency information is changed from frequency and segment into frequency; for a BS$_n$ in initial network construction, the BMU first acquires a Neighborlist (BS$_n$) of each BS$_n$; a BS$_i$ having the simplest neighbor relation is selected, which is often physically located on the edge of an area, with Freq (BS$_i$) randomly selected by a program; a frequency distribution program is automatically executed to determine the Freq (BS∈ Neighborlist (BS$_i$)) in the Neighborlist (BS$_i$), based on the principle that neighboring base stations are distributed with different frequencies; and an iterative program is executed until the frequency information is distributed for all the base stations.

Considering that part of operators may not have plenty of frequency resources, during the setting of a neighbor cell list, the present invention considers that base stations, which are physically neighbor but have an excellent isolation in neighboring areas, are not logically neighbor.

Step 1204, a receiver is started to carry out an RSSI (Received Signal Strength Indication) signal detection on the frequency, and step 1205 will be performed.

Step 1205, if the interference signal at the frequency is smaller than a given threshold, then the frequency is available, and step 1206 will be performed; if a severe interference is found in the interference signal detection flow, that is, the interference signal at the frequency is greater than or equal to a given threshold, step 1203 will be performed for re-selecting a frequency.

Step 1206, the system works normally, and starts the transceiver circuit of the base station.

Step 1207, uplink processing and downlink processing are carried out according to the wireless parameter configuration of the network management, and the entire flow ends.

The automatic frequency distribution flow can be enabled or disenabled by a network management interface so as to accommodate itself to network environments with different complexities.

In summary, the present invention provides a hierarchical architecture for a wireless access system focusing on indoor coverage and a specific solution for the hierarchical architecture, which have the following technical advantages at least:

1) a flexible interface and medium between the Pico BS and the BMU are beneficial for engineering deployment and fast network construction;

2) a hierarchical network management architecture is supported, which greatly improves the expansion performance and the network performance of the system, and is beneficial for large-capacity network construction; the most flow of the hierarchical transmission of network management information and the local routing of the internal information of base stations on the BMU side is controlled within a local network, saving the network management and transmission bandwidth;

3) as the BMU is installed close to Pico BSs and the signaling interaction is completed in a local area network, the performance of media plane interaction among base stations subordinate to the BMU is greatly improved, including delay reduction, jitter reduction and the reduction in access time, switching interruption and completion time, and consequentially, customer satisfaction is upgraded;

4) base stations share the GPS clock configured by the BMU, the transmission of timing information over twisted pair cables, cables, optical fibers and even power lines is supported; the restoration of timing information is completed in the base station, there is no need to configure a GPS module or an antenna for each base station, thus, the engineering difficulty in the arrangement of indoor cables and the installation of antenna as well as the engineering cost is reduced, and the CAPEX and OPEX of the operator are reduced;

5) due to the uncertainty brought about by the interference signals of a power line system, the present invention can realize the intelligent adaptive scheduling mechanism of the system according to a link state and the restoration quality of timing signals, guaranteeing the robust running of the system, and greatly improving the adaptive capacity of the system to environment as well as the availability of the system;

6) the upgrade from the PUSC Segment to the PUSC ALL Sub-Channel is supported;

7) Pico BSs can be combined through a distributed antenna system (DAS) in a local range and antennas are close to user units, thus the coverage performance of system is greatly improved, moreover, the proportion increase of high-order modulation improves the average throughput of system.

INDUSTRIAL APPLICABILITY

The present invention can be applied to a wireless access system to solve the conflict among indoor deployment difficulty, quantities and maintenance management, and to distribute GPS clock message packets to base stations at a centralized location so that indirect synchronization among the base stations is realized. For the network quality of transmission based on power lines, a dynamic scheduling mechanism based on quality of timing restoration is proposed, which provides a high interface capacity when the timing precision is high and guarantees the reliable running of the system by lowering the capacity of the system when the timing precision is low.

The invention claimed is:

1. A hierarchical wireless access system including terminals, access points, centralized access gateways, and further including a plurality of master access point management units located at an access layer and adopting a distributed architecture, wherein the master access point management units respectively have communication interfaces interacting with the centralized access gateways or core networks, or interact with the centralized access gateways and the core networks, and one or more access points are attached to the master access point management units, and the master access point management units are for processing and forwarding data and signaling interaction among the attached access points, and providing functions of access gateway, local operation and maintenance and network management for the attached access points; and wherein the wireless access system further including one or more slave access point management units, which are connected with the master access point management units directly or after being cascaded, and each of the one or more slave access point management units is attached with a part of the one or more access points attached to master access point management units, so as to process and forward data and signaling interaction among the attached access points;

master access point management units and slave access point management units which are directly connected with the access points have a power-line modulation and demodulation function, and adopt the power line as a transmission medium to directly connect with the attached access points; and a communication cable is used as a transmission medium between the master access point management unit and the slave access point management unit.

2. The wireless access system according to claim 1, wherein the access gateway function of the master access point management unit is realized by an access gateway functional module AGW-Lite thereof, which is used for converging access information of attached access points and processing tunnel protocols, providing routing switching information to a corresponding centralized access gateway, providing communication interfaces to interact with the centralized access gateways or core networks, or interact with the centralized access gateways and the core networks, and realizing one of the following functions: local wireless resource processing, self-routing for local flows, ending processing for tunnel processing of attached access points, flow shaping and flow control on attached access points and data stream scheduling processing based on access points.

3. The wireless access system according to claim 1, wherein the master access point management unit is connected with its attached access points directly or via a switch; and a communication cable is used as a transmission medium between the master access point management unit and the access points directly connected with the master access point management unit; or the master access point management unit has a power-line modulation and demodulation function, and the power line is used as a transmission medium between the master access point management unit and the access points that are directly connected with the master access point management unit.

4. The wireless access system according to claim 1, wherein the master access point management units, or the master access point management units and the slave master access point management units, include timing servers for generating timing information and distributing the information to each attached access point; and the access point includes a timing client for receiving and restoring the timing information and taking the restored timing information as a local reference timing signal.

5. The wireless access system according to claim 4, wherein the timing server is a timing over packet server, namely, a ToP server, and the timing client is a timing over packet client, namely, a ToP client;

the ToP server is used for generating a timing information packet according to a reference timing signal output by a Global Positioning System (GPS) receiving module or an external synchronous clock source and distributing the timing information packet in the form of a ToP information packet to each ToP client via network interfaces on the access point management unit side and the access point side; and after receiving the timing information packet, the ToP client restores the timing information and sends the restored information to a baseband and radio frequency module in the access points.

6. The wireless access system according to claim 1, wherein the wireless access system is applied to a scene of indoor coverage or a scene of mixed indoor coverage and outdoor coverage.

7. The wireless access system according to claim 6, wherein to the wireless access system is an access service network of a WiMAX system, the access point is a Pico base station (Pico BS); the centralized access gateway is an access service network gateway ASN-GW; and the master access point management unit interacts with the ASN-GW and/or network elements of a connection service network via the access gateway functional module.

8. The wireless access system according to claim 7, wherein in the wireless access system a standard R6 interface is used between the master access point management unit and the Pico BS, or between the master access point management unit or the Pico BS and the slave access point management unit; a standard R3 interface is used between the master access point management unit and a network element of the connection service network; and a standard R4 interface is used between master access point management units and between the master access point management unit and the centralized access gateway.

9. The wireless access system according to claim 1, wherein the wireless access system further including one or more couplers or power dividers taking the access points as signal sources, and a passive distributed antenna system connected with the couplers or power dividers.

10. The wireless access system according to claim 1, wherein the wireless access system adopts a PUSC (Partially Used Sub-channel) ALL Sub-Channel networking mode; or the wireless access system adopts a PUSC Segment networking mode; or the wireless access system adopts the PUSC Segment networking mode in a coverage-limited area and uses the PUSC ALL Sub-Channel networking mode in other areas.

11. The wireless access system according to claim 1, wherein the wireless access system combines multiple physically separated access points into a logical cell group, in which access points share different sub-channels of a channel; different logical cell groups are distributed with different channels; and the master access point management unit distributes sub-channels according to location relations among the access points subordinate to the logical cell groups.

12. The wireless access system according to claim 3, further including one or more couplers, which couple three-phase currents of one transformer.

13. A slave access point management unit in a hierarchical wireless access system, the hierarchical wireless access system including the slave access point management unit located at an access layer and access points attached to the slave access point management unit; the slave access point management unit at least including:

a master control switching module, having a communication interface interacting with access points attached to the slave access point management unit, for processing and forwarding data and signaling interaction of the access points attached to the slave access point management unit; and a timing client for regenerating and distributing clock information to timing clients of access points attached to the slave access point management unit via the master control switching module; and wherein the master control switching module further has a communication interface connected to a master access point management unit directly, and in the case where the communication interface is not connected directly to the master access point management unit, then the communication interface is connected via another slave access point management unit, and the master access point management unit is configured to process and forward data and signaling interaction among access points attached to the master access point management unit, and provide functions of access gateway, local operation and maintenance and network management for the access points attached to the master access point management unit; and the slave access point management unit further includes a power line modulation demodulation functional module, which is connected with the master control switching module and connected to an access point attached to the slave access point management unit via a power line to modulate and demodulate signals transmitted by the power line and to perform a link detection or adaptive processing, or to perform the link detection and the adaptive processing.

14. The slave access point management unit according to claim 13, wherein the timing client regenerates a timing, and relays the hardware timestamp to a timing over packet (ToP) client of the access point attached to the slave access point management unit via a ToP information packet.

15. The slave access point management unit according to claim 13, further including a clock source, which is for generating a hardware timestamp according to a reference timing signal output by a GPS receiving module or an external synchronous clock source.

16. A master access point management unit in a hierarchical wireless access system, the hierarchical wireless access system including the master access point management unit located at an access layer and access points attached to the master access point management unit; the master access point management unit at least including:

a master control switching module, having a communication interface interacting with access points attached to the master access point management unit, for processing and forwarding data and signaling interaction of the access points attached to the master access point management unit; and a timing server for distributing clock information to timing clients of access points attached to the master access point management unit via the master control switching module; and wherein the master access point management unit is connected to a slave access point management unit, and the slave access point management unit is attached with a part of the access points attached to the master access point management units, so as to process and forward data and signaling interaction among the attached access points; and the master access point management unit further includes a power line modulation demodulation functional module, which is connected with the master control switching module and connected to an access point attached to the master access point management unit via a power line to modulate and demodulate signals transmitted by the power line and to perform a link detection or adaptive processing, or to perform the link detection and the adaptive processing.

17. The master access point management unit according to claim 16, wherein the master access point management unit is integrated with an access gateway functional module which is for converging access information of access points attached to the master access point management unit, processing tunnel protocols, providing routing switching information to a corresponding centralized access gateway, providing communication interfaces interacting with core networks, and realizing one of the following functions: local wireless resource processing, self-routing for local flows, ending processing for tunnel processing of attached access points, flow shaping and flow control on attached access points and data stream scheduling processing based on access points.

18. The master access point management unit according to claim 17, wherein the master access point management unit further includes a centralized network management functional module which is connected with the master control switching module to realize a centralized agent function on local network management and to process operation maintenance information, including one or more of the following: performance statistics, alarm management, version management, configuration management and fault diagnosis.

19. The master access point management unit according to claim 16, wherein the timing server is a timing over packet server, namely, a ToP server, which is for generating a hardware timestamp according to a reference timing signal output by a GPS receiving module or an external synchronous clock source, and distributing the hardware timestamp to a ToP client of the access point attached to the master access point management unit via a ToP information packet.

20. The master access point management unit according to claim 16, further including a clock source, which is connected with the timing server to output a reference timing signal to the timing server.

\* \* \* \* \*